US009836759B2

(12) United States Patent
Georgi

(10) Patent No.: US 9,836,759 B2
(45) Date of Patent: Dec. 5, 2017

(54) UNIVERSAL TRANSACTION ASSOCIATING IDENTIFIER

(71) Applicant: Randolph Ken Georgi, Mill Valley, CA (US)

(72) Inventor: Randolph Ken Georgi, Mill Valley, CA (US)

( * ) Notice: Subject to any disclaimer, the term of this patent is extended or adjusted under 35 U.S.C. 154(b) by 180 days.

(21) Appl. No.: 13/959,393

(22) Filed: Aug. 5, 2013

(65) Prior Publication Data

US 2014/0039990 A1 Feb. 6, 2014

Related U.S. Application Data

(60) Provisional application No. 61/680,131, filed on Aug. 6, 2012.

(51) Int. Cl.
*G06Q 30/02* (2012.01)

(52) U.S. Cl.
CPC ..... *G06Q 30/0229* (2013.01); *G06Q 30/0207* (2013.01); *G06Q 30/0224* (2013.01); *G06Q 30/0236* (2013.01); *G06Q 30/0255* (2013.01)

(58) Field of Classification Search
None
See application file for complete search history.

(56) References Cited

U.S. PATENT DOCUMENTS

| 6,151,604 A | 11/2000 | Wlaschin et al. |
| 6,594,640 B1 | 7/2003 | Postrel |
| 6,671,358 B1 * | 12/2003 | Seidman et al. ........... 379/93.12 |
| 7,788,129 B2 | 8/2010 | Antonucci et al. |
| 8,880,905 B2 | 11/2014 | Colclasure et al. |
| 2002/0062249 A1 * | 5/2002 | Iannacci ................ G06Q 20/10 705/14.1 |

(Continued)

OTHER PUBLICATIONS

*Enfish, LLC v. Microsoft Corp*, U.S. Pat. No. 6,163,775, Case 2015-1244, Decided: May 12, 2016; pp. 5, 7, 9-20, 30.

(Continued)

*Primary Examiner* — Eric R Netzloff
*Assistant Examiner* — Christopher Stroud

(57) ABSTRACT

Rewards programs in which rewards are awarded for a series of transactions using a universal transaction associating identifier to associate transactions in common within each rewards program in a reward processing system. The system includes resource providers, a rewards program rule implementer having access to a rewards program database, and an implementer processor. The implementer processor receives transaction data whenever a transaction occurs using the universal transaction associating identifier, determines when a consumer has performed the transactions satisfying rules requirements, and identifies and awards a reward, including vouchers, for the consumer. The reward processing system generates a universal transaction associating identifier from a plurality of identification sources and provides for objects containing the universal transaction associating identifier. The reward processing system issues and redeems vouchers exchangeable for rewards. The system targets consumers and transmits messages adaptive to system elements, including rules requirements and the universal transaction associating identifier.

36 Claims, 14 Drawing Sheets

(56) References Cited

U.S. PATENT DOCUMENTS

| | | | |
|---|---|---|---|
| 2003/0236712 A1 | 3/2003 | Antonucci et al. | |
| 2003/0127299 A1 | 7/2003 | Jones et al. | |
| 2004/0117261 A1* | 6/2004 | Walker | G06Q 20/105 705/14.13 |
| 2005/0055270 A1 | 3/2005 | Broe | |
| 2005/0209921 A1 | 9/2005 | Roberts et al. | |
| 2006/0293948 A1 | 12/2006 | Weinblatt | |
| 2007/0038515 A1 | 2/2007 | Postrel | |
| 2010/0145778 A1 | 6/2010 | Fordyce, III | |
| 2010/0191594 A1 | 7/2010 | White et al. | |
| 2011/0082731 A1* | 4/2011 | Kepecs | 705/14.17 |
| 2011/0178861 A1 | 7/2011 | Georgi | |
| 2012/0130536 A1* | 5/2012 | Canter | G07F 9/026 700/237 |
| 2012/0303430 A1* | 11/2012 | Tiku | G06Q 20/387 705/14.17 |
| 2013/0046686 A1* | 2/2013 | Ress et al. | 705/40 |

OTHER PUBLICATIONS

Memorandum, May 19, 2016 to the Patent Examining Corps, from Robert Bahr, Deputy Commissioner for Patent Examination Policy, 2 pages.
Discover (R) Card press release, Dec. 3, 2008; http://www.investor-relations.discoverfinancial.com/phoenix.zhtml?c=204177&p=irol newsArticle&ID=1232068&highlight=&gcmpgn=0809_ZZ_srch_gsan_txt_1&srchQ=turn%20receipts%20into%20rewards&srchS=internet_cm_corp&srchC=internet_cm_fe&srchP=0.
Discover (R) Card press release, Nov. 16, 2006; http://www.investorrelations.discoverfinancial.com/phoenix.zhtml?c=204177&p=irol newsArticle&ID=1005757&highlight=&gcmpgn=0809_ZZ_srch_gsan_txt_2&srchQ=turn%20receipts%20into%20rewards&srchS=internet_cm_corp&srchC=internet_cm_fe&srchP=0.
URL: http://searchoracle.techtarget.com/definition/record Oracle Corp Definition of "Record".
URL: https://en.wikipedia.org/wiki/Record_(computer_science) Wikipedia definition of database "record".
Paul E. Black (ed.), Dictionary of Algorithms and Data Structures. U.S. National Institute of Standards and Technology. Dec. 15, 2004.
National Information Standards Organization (NISO) (2001). Understanding Metadata (PDF). NISO Press. ISBN 1-880124-62-9. 18 pp.
URL: https://en.wikipedia.org/wiki/Metadata Wikipedia definition of "metadata".
USPTO Information Technology Standards and Guidelines Program, Electronic Records Management, Technical Standard and Guideline IT-212.03-15. Jul. 2002, 58 pages, pp. 2-6.
URL: https://en.wikipedia.org/wiki/Tag Wikipedia definition of "tag".
URL: https://en.wikipedia.org/wiki/Tag_(metadata) Wikipedia definition of "tag (metadata)".
URL: http://www.aspencrypt.com/crypto101_hash.html Persits Software, Inc. New York, NY 10018. Chapter 3 One-way Hash Functions.
URL: https://en.wikipedia.org/wiki/Cryptographic_hash_function Wikipedia definition of "Cryptographic hash function".

* cited by examiner

Resource Provider Transactions Database 188

Resource Provider Transactions Database

| Transaction 420 | UID120 422 | Amount 424 | Timestamp 426 | Payment Type 428 | Vendor 430 |
|---|---|---|---|---|---|
| 111111111 | 222126000006875 | $45 | 5/1/2012 11:04 am | Credit Card | Visa |
| 111111112 | 222103000000010 | $50 | 5/1/2012 12:16 pm | Cash | N/A |
| 111111113 | 222125000001249 | $30 | 5/1/2012 1:23 pm | Mobile Device | PayPal |
| 111111114 | 222139000038999 | $30 | 5/2/2012 10:21am | Credit Card | Amex |
| 111111115 | 222103000000010 | $15 | 5/2/2012 2:34 pm | Check | N/A |
| ... | ... | ... | ... | ... | ... |

FIG. 4B

Reward Handler Transactions Database 192

| Merchant 450 | Group 452 | Transaction 454 | UID120 456 | Amount 458 | Timestamp 460 |
|---|---|---|---|---|---|
| XXX | 110 | 111111111 | 2221260000006875 | $45 | 5/1/2012 11:04 am |
| YYY | 110 | 111111442 | 2221260000006875 | $50 | 5/1/2012 12:16 pm |
| ZZZ | 110 | 111111773 | 2221260000006875 | $30 | 5/1/2012 1:23 pm |
| XXX | 110 | 111111884 | 2221390000038999 | $90 | 5/2/2012 10:21am |
| VVV | 110.. | 111111995 | 2221390000038999 | $45 | 5/2/2012 2:34 pm |
| ... | | | | | |

FIG. 4C

Reward Program Database 194

| Reward ID | Group | Merchant | UID120 | Amount | Timestamp | Rules | Redeemed |
|---|---|---|---|---|---|---|---|
| 999111111 | 6110 | XXX | 2221260000006875 | $45 | 5/1/2012 11:04 am | | |
| | | YYY | 2221260000006875 | $50 | 5/1/2012 12:16 pm | | |
| | | ZZZ | 2221260000006875 | $30 | 5/1/2012 1:23 pm | $120 in 7 days | 6/3/2012 12:33 pm |
| 999111112 | 6111 | YY1 | 2221390000038999 | $90 | 5/2/2012 10:21am | | |
| | | YY2 | 2221390000038999 | $45 | 5/2/2012 2:34 pm | $120 in 72 hours | 6/24/2012 4:52 pm |
| ... | | | | | | | |

UNIVERSAL TRANSACTION ASSOCIATING IDENTIFIER

CROSS REFERENCE TO RELATED APPLICATIONS

This application claims priority to U.S. Provisional Patent Application No. 61/680,131, filed Aug. 6, 2012, titled, "Systems and Methods for Electronic Reward Generation with Universal Transaction Identifier. This application is also related to U.S. patent application Ser. No. 12/942,693, filed Nov. 10, 2010 titled, "Electronic Reward Generation," which claims priority to U.S. Provisional Patent Application No. 61/264,610, filed Nov. 25, 2009, titled "Electronic Reward Generation." All such provisional and non-provisional patent applications are herein incorporated by reference in their entirety for all purposes.

FIELD

The disclosure generally relates to the field of electronic commerce, and more specifically, identifying/analyzing transactions among disparate entities in incentive programs.

BACKGROUND

Unless otherwise indicated herein, the approaches described in this section are not prior art to the claims in this application and are not admitted to be prior art by inclusion in this section.

Conventional electronic payment processing systems provide a deficient framework for fashioning an improved rewards system to serve the interests of multiple disparate merchants. Transaction-based rewards programs for modifying human behavior are commonly operated by payment processors having a vested interest in certain payment card brands, account enrollments, devices, reward types, and methods beneficial to themselves. Deficiencies of this arrangement sharply limit merchants' marketing opportunities and the size of the eligible consumer market.

Deficiencies of such systems include: (i) current dependence among disparate merchants on a handful of payment processor firms which dominate multi-merchant rewards systems; (ii) among those payment processor firms, conflicting interests with merchants often arising from self-serving rewards program rules; (iii) promotion of loyalty principally to the payment processor/card brand; (iv) mandatory account enrollment by a consumer with a particular processor/issuer brand; (v) unappealing rewards such as 2% cash back, points, and airline miles, the rewards merely issued as a credit to the mandatory account; (vi) payment processor control of transaction data; (vii) "vendor lock-in" wherein each payment processor's proprietary security methods govern mandatory compliance with Payment Card Industry Data Security Standards (hereafter "PCI DSS," also regulated by some of the same firms); (viii) intrusive behavior tracking practices unwanted by many consumers; (ix) inadequate organizing of groups of disparate merchants and of rewards programs, (x) significant processor costs, (xi) minimally effective methods to induce desired visiting and spending behaviors at the enrolled merchants, the methods instead favoring the payment processor.

BRIEF DESCRIPTION OF THE DRAWINGS

The disclosed embodiments have other advantages and features which will be more readily apparent from the detailed description, the appended claims, and the accompanying figures.

FIG. 4B illustrates one embodiment of a first example transactions database that may form part of the system shown in FIGS. 1A/1B;

FIG. 4C illustrates one embodiment of a second example transactions database that may form part of the system shown in FIGS. 1A/1B;

FIG. 4D illustrates one embodiment of an example rewards program database that may form part of the system shown in FIGS. 1A/1B;

SUMMARY

Figure 1A:
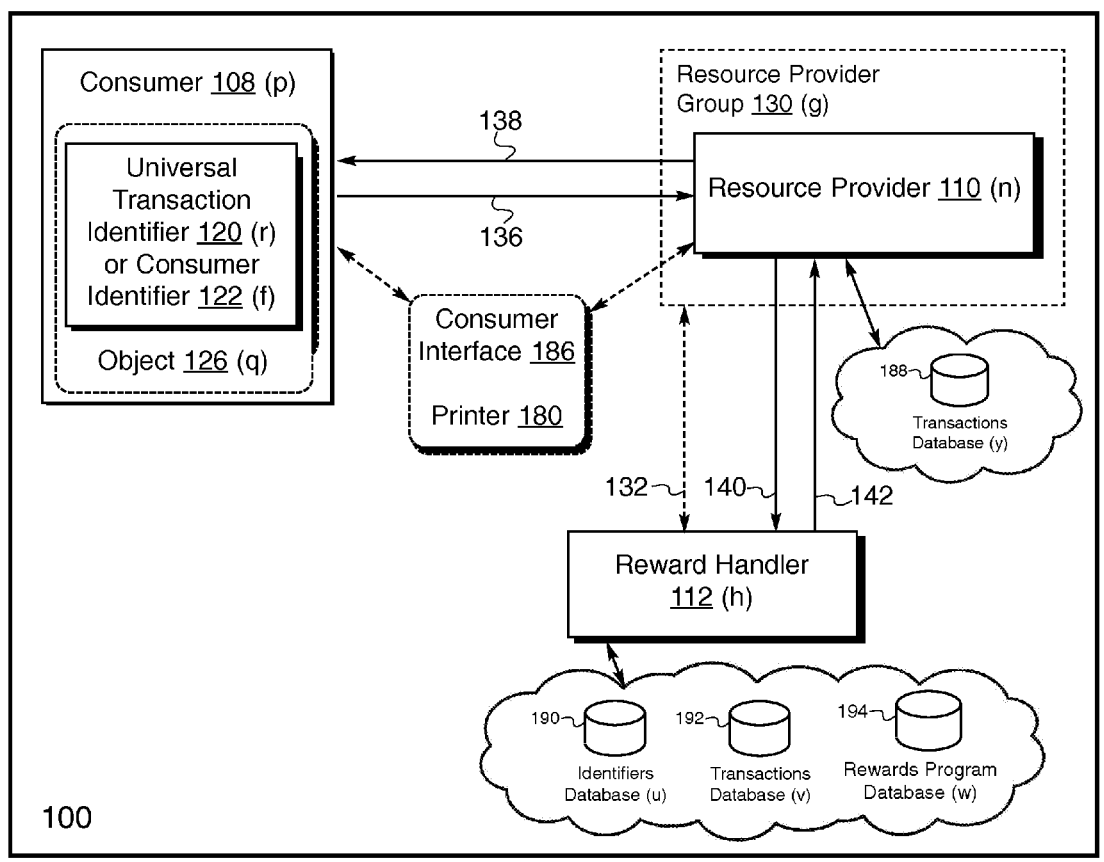
FIG. 1A illustrates one embodiment of an electronic reward generation system for resource providers.

One example system is for implementing at least one of a plurality of rewards programs wherein one or more rewards is awarded for a series of one or more transactions among a plurality of resource providers in a reward processing system, a system-generated unique universal transaction associating identifier associated with each of the plurality of transactions, wherein the reward processing system includes a plurality of resource providers and a reward handler, the system comprising a rewards program database including rewards program rules wherein the rewards program rules require that a consumer perform one or more transactions associated with at least one of the plurality of resource providers and specify a reward to be awarded upon the consumer performing the one or more transactions associated with at least one of the plurality of resource providers, wherein each of the transactions within a rewards program must be performed using the universal transaction associating identifier associated with each transaction and a rewards program rule implementer having access to the rewards program database and including an implementer processor, the implementer processor programmed to perform the steps of receiving at least a subset of reward-related transaction data whenever a transaction occurs using the transaction associating identifier associated with each transaction, analyzing the at least a subset of reward-related transaction data to determine that a consumer has performed, satisfying the one or more rewards program rules requirements, the one or more transactions associated with at least one of the plurality of resource providers, when a consumer has performed, satisfying the one or more rewards program rules requirements, the one or more transactions with at least one of the plurality of resource providers, identifying a reward, including one or more vouchers exchangeable for a reward, for the consumer that performed the one or more transactions, and communicating, responsive to the analyzing, a message associated with the reward-related transaction data.

In various embodiments, a transaction associating identifier generation processor including the reward handler processor may generate a unique universal transaction associating identifier (a UID120) from one of a plurality of sources of identification wherein the UID120 is useful for identifying transactions in common within a rewards program in the example reward processing system set forth in the preceding paragraph. In various embodiments, the transaction associating identifier generation processor may generate the UID120 from a first consumer identifier (hereafter called a "CID122") presented by the consumer wherein a CID122 may include, for example, (i) a digital string contained in a non-transitory machine-readable medium associated with an object (including a credit/debit card), (ii) a data entry using an input device (including a phone number), (iii) a pattern detectible in an object (including a graphic image, a photograph, and a bar code printed on a sheet), (iv) a pattern or a string conveyed by a mobile device or transponder, e.g., near-field communications (NFC), (v) biometric information, and (vi) other forms of identification, each CID122 digitized or subject to digitization, wherein upon detection or digitization the CID122 comprises a first string. A string generation processor including one of a resource provider apparatus and a consumer apparatus may combine the CID122 (the first string) with additional data, wherein the CID122 and the additional data may be processed in a computer implemented process to generate a second string, in a typical embodiment comprising composite data, the second string hereafter called an "XID124". The transaction associating identifier generation processor may generate from the XID124 in a computer implemented process a third string, a UID120. Embodiments provide for a first, a second, and a third method of identification progressing from a CID122 to an XID124 to a UID120, each stage transforming the previous one and acquiring new properties and functionality. A resulting UID120 generated ultimately from a CID122 original source is associated with each transaction in a rewards program wherein a UID120, in one of several functionally equivalent forms, serves as a universal transaction associating identifier. The particular UID120 associated with a given transaction is determined by the source of identification presented by a consumer (i.e., a CID122 or a UID120) in a first or a second or a subsequent transaction in a rewards program, and whether a new UID120 is required to be generated or a UID120 corresponding to the presented CID122 or UID120 has previously been recorded in a transaction associating identifiers database.

A UID120 is a proprietary string which cannot be used to regenerate or retrieve its original CID122 source, ensuring security. In various embodiments, at least one of a UID120 and a CID122 are associated with an object, wherein the at least one of a UID120 and a CID122 may be detected at a transaction including by a machine. A UID120 is a physical quantity which in at least some cases may be contained in one or more of a non-transitory machine-readable medium and a system database.

In a typical embodiment, when a CID122 is presented by a consumer, it will consistently generate through several steps the same functionally equivalent UID120, or correlate to the same UID120 when a UID120 was previously generated from the CID122, wherein a CID122 may be presented by a consumer while its corresponding generated UID120 may be used within the reward system to identify and associate transactions in common. In various other embodiments, a UID120 may be generated without presenting a CID122, wherein the UID120 may be generated autonomously by the reward system for any purpose and may be distributed by any method. In various embodiments, a UID120, e.g., contained in an object, may be changed from time to time in different rewards programs.

In various embodiments, the determination of a particular transaction associating identifier to be associated with a transaction occurs by one of (i) presentation by a consumer to a resource provider before, during, or after a transaction of a UID120 or a CID122, (ii) retrieval from a transaction associating identifiers database of a previously recorded UID120, and (iii) generation during or after a transaction of a UID120, wherein the transaction associating identifier (e.g., a CID122 or a UID120) is recorded as a UID120 in the transaction associating identifiers database apparatus upon its first use in a rewards program and wherein the same UID120 can be associated with each transaction in a second or subsequent transaction in the rewards program. In various embodiments, a generated UID120 is transmitted directly or indirectly from the transaction associating identifier generation processor to the resource provider and the consumer including for use in a subsequent transaction. In various embodiments, at least one of a UID120, a CID122, and an XID124 are recorded in a system database wherein each source of identification is indexed so as to enable correlating and retrieving it. In various embodiments, security measures including PCI DSS compliance are provided in generating a UID120 to deter fraud and protect data. By methods including those described above, a consumer may present one of a UID120 and a CID122 to provide a common transaction associating identifier for transactions in common in a rewards program.

In various embodiments, the rule implementer is the reward handler that receives the reward-related transaction data from the plurality of resource providers. In various embodiments, the reward handler may organize one or more groups of disparate resource providers in different rewards programs. In various embodiments, a resource provider may be one of a merchant, a shopping center, a service provider, a financial services firm, a non-retailer entity, a manufacturer, and a person. In various embodiments, the reward handler may establish resource provider-friendly rules, wherein prior art rewards program rules commonly promote loyalty principally to branded payment processors/card issuers and not to resource providers. In various embodiments, the system may exclude requirements for a resource provider to participate, such as enrollment with a particular payment processor and use of at least one of a particular payment method, a security method, and use of a card or a device. By these methods and having fewer requirements, the reward system may enlarge the resource provider market for rewards programs.

In various embodiments, a CID122 may be presented in the absence of a requirement of one or more of (i) consumer disclosure of personal or identification data, (ii) consumer enrollment with a particular payment processor/loyalty system, and (iii) consumer use of one or more of a payment method, an account, a card, and a particular device, wherein a consumer's privacy may be preserved and behavior tracking may be reduced. In various embodiments, the consumer may include a person and a group of persons. By these methods and having fewer requirements, the system may enlarge the consumer market for rewards programs.

In various embodiments, the rules may require that, for a reward to be awarded, each of the transactions includes at least one of a non-monetary transaction including at least one of an act and a behavior, and a purchase of at least one of a product and a service. In various embodiments, the rules may require that each transaction includes the consumer purchasing at least one product/service from a resource provider wherein the consumer must spend a reward-eligible amount greater than a minimum threshold amount with the combined plurality of resource providers for a reward to be awarded. In various embodiments, the rules requirements may include a timing requirement including when qualifying spending must occur, e.g., tied to the time of day and certain days of the week, for a reward to be awarded. In various embodiments, the rules requirements may be changed from time to time, including by remote methods. In various embodiments, the program rules requirements may be publicized/transmitted by any method to any entity.

In various embodiments, the reward-related transaction amount may be based on reward-eligible items excluding reward-ineligible charges. In various embodiments, the reward-eligible amount (total) may differ from a transaction total which may be submitted to a payment processor for any purpose including payment authorization.

In various embodiments, payment for a transaction may be tendered by any payment method including cash, a check, a card, and a mobile device payment method including by near-field-communications (NFC) technology. In various embodiments, a payment may be made by use of a consumer object including a credit/debit card and a mobile device. In various embodiments, a transaction may require processing by a payment processor wherein payment processing is a separate process from reward processing in the present system. In various embodiments, reward processing may not proceed in the absence of a payment processor authorization. In various embodiments, the resource provider may transmit reward-related transaction data to the rule implementer for reward processing.

In various embodiments, the rule implementer may track consumer performance of separate transactions and may transmit one or more messages to at least one of a plurality of consumers and at least one resource provider, including a message indicating one of satisfaction of program rules requirements wherein a reward should be awarded, and non-satisfaction of program rules requirements. In various embodiments, upon determining that a reward should not be issued to a consumer, the rule implementer may transmit a message indicating unmet rules requirements to one or more consumers and one or more resource providers. In various embodiments, at least one message may include information about satisfying the rules requirements including the amount of spending required and a list of one or more resource providers at which the rules requirements can be satisfied in full or in part. In various embodiments, the message may include an indication that a reward can be awarded and a choice for the consumer to accept or not accept the reward, wherein the consumer may pursue a greater reward by not accepting the reward. In various embodiments, at least one message to the at least one of a plurality of consumers may include information including an incentive, a coupon, a message, and an advertisement, wherein the information may be associated with an element in the system, for example, the remaining unmet requirement to qualify, the message intended to induce further spending or a desired behavior. In various embodiments, use of the information as a first incentive, e.g., a discount coupon, may qualify the user for a reward as a second incentive in the same qualifying transaction, both the discount and the reward being honored. In various embodiments, at least one message including a coupon and an advertisement may be transmitted to a plurality of consumers.

In various embodiments, upon determining that a reward should be awarded to the consumer, the rule implementer awards the reward. In various embodiments, the resource provider may award the reward to the consumer immediately at the point of sale. In various embodiments, the reward may be awarded in the form of one or more universal vouchers exchangeable for a reward from a reward provider. In various embodiments, each said voucher may be one of a physical voucher and an electronic voucher. In various embodiments, vouchers may be aggregated by the consumer from any source including multiple disparate rewards programs and various voucher issuers to exchange for a single reward of greater value, which may have increased incentive value to the consumer.

In various embodiments, each of a plurality of reward providers may provide one or more rewards for one or more rewards programs, wherein the consumer may select a reward from any active reward provider, subject to program rules. In various embodiments, a reward provider may be a different entity in a different role than a resource provider. In various embodiments, a reward provider may issue a reward including in exchange for one or more vouchers upon redemption. In various embodiments, participation of at least one of a plurality of reward providers in a rewards program may be determined in a competitive bidding reward provider market as provided in U.S. patent application Ser. No. 12/942,693 wherein the subject of bidding may include (i) a selection of one or more rewards, (ii) the amount of a reward fee reimbursable to a reward provider for redeeming a voucher, (iii) redemption terms, (iv) the time period of a transaction and a redemption, and (v) other terms. In various embodiments, a reward provider may seek to drive traffic and otherwise obtain benefits by participating in one or more rewards programs.

In various embodiments, upon issuing a reward to the consumer, the rule implementer identifies entities responsible for funding the associated reward system costs including the reward, and transmits funding requests to each of the entities responsible for funding the system. In various embodiments, the reward system costs may be controlled wherein the rules may be adjusted from time to time including by increasing and decreasing the minimum qualifying spending threshold, wherein the system costs may equal or approximate a certain percentage of gross sales of the resource providers in a time period, or any other value. In various embodiments, the entities responsible for funding the reward may include at least one of the plurality of resource providers. In various embodiments, for each reward the consumer may spend a total reward-eligible amount with at least one of the plurality of resource providers wherein each of the plurality of resource providers is responsible for a percentage of the total costs associated with the reward that depends on the amount spent with each resource provider in relation to the total reward-eligible amount spent with the plurality of resource providers. In various embodiments, the entities responsible for funding the reward include at least one of the reward handler and a third party.

At least some embodiments include a method for implementing at least one of a plurality of rewards programs wherein rewards are awarded for a series of one or more transactions using a universal transaction associating identifier associated with each transaction within each rewards program in a reward processing system, wherein the reward processing system includes a plurality of resource providers and a reward handler, the method comprising the steps of providing rewards program rules wherein at least one rewards program rule requires that a consumer perform one or more transactions associated with at least one of the plurality of resource providers and specify a reward to be awarded upon the consumer performing the one or more transactions associated with the at least one of the plurality of resource providers, wherein each of the transactions must be performed using the universal transaction associating identifier associated with each transaction within a rewards program, receiving at least a subset of reward-related transaction data whenever a transaction occurs using the transaction associating identifier, analyzing the at least a subset of the reward-related transaction data to determine that a consumer has performed, satisfying the one or more rewards program rules requirements, the one or more transactions associated with at least one of the plurality of resource providers, and when a consumer has performed the one or more transactions, satisfying the one or more rewards program rules requirements, identifying a reward, including one or more vouchers exchangeable for a reward, for the consumer that performed the one or more transactions, and communicating, responsive to the analyzing, a message associated with the reward-related transaction data.

Other embodiments include a non-transitory computer readable medium having computer readable program code technology embodied therein for implementing a rewards program wherein rewards are awarded for a series of one or more transactions with at least one of a plurality of resource providers using a universal transaction associating identifier associated with each of the plurality of transactions within each rewards program in a reward processing system, wherein the reward processing system includes a plurality of resource providers and a reward handler, the computer readable program code technology in the article of manufacture comprising computer readable program code technology for causing a computer to receive reward-related transaction data whenever a transaction occurs using the transaction associating identifier associated with each transaction within a rewards program, computer readable program code technology for causing a computer to analyze the reward-related transaction data to determine that a consumer has performed, satisfying at least one rewards program rules requirement, the one or more transactions associated with at least one of a plurality of resource providers, and computer readable program code technology for causing a computer, when a consumer has performed, satisfying the one or more rewards program rules requirements, the one or more transactions associated with the at least one of the plurality of resource providers to identify a reward, including one or more vouchers exchangeable for a reward, for the consumer that performed the one or more transactions, and communicate, responsive to the analyzing, a message associated with the reward-related transaction data.

The present reward system is not itself a loyalty system generally intended to generate repeat business, in part because a consumer may change its UID120 from time to time in different rewards programs, eradicating and precluding any association with a trackable loyalty history. Most prior art reward systems are loyalty systems designed to track a consumer's history by means of an account. In contrast, the present system is intended to promote qualifying behaviors, i.e., it drives spending typically within a short-term time period (as expiration-dated coupons do) among disparate resource providers in a collective marketing system. It is not intended to promote nor does it reward recurring business over a longer time (beyond a given rewards program) by a consumer repeatedly and loyally using the same payment processor's consumer account or patronizing the same merchant. The present system is distinguished by design from loyalty-type rewards systems and programs in a tradeoff of capabilities, benefits, and purposes, thereby enabling advances described herein. Said advances overcome deficiencies in prior art rewards systems.

As compared to other reward systems, the present disclosure provides an improved system and methods for a larger market of reward providers in a broader scope of retail and many other industries to provide more attractive, motivating rewards to a larger consumer market, including (i) universal consumer eligibility, (ii) universal payment methods, (iii) universal transaction associating identifiers (UID120s) for reward qualification processing, (iv) issuance and redemption of universal vouchers redeemable for rewards at diverse reward providers, (v) a competitive reward provider market yielding economic advantages and improved rewards, (vi) less restrictive rewards program rules requirements, (vii) secure electronic rewards processing compliant with PCI DSS, and (viii) other innovative methods.

DETAILED DESCRIPTION

Embodiments of the present disclosure include a rewards system which has particular application in rewards programs that incentivize human behaviors desirable to participating entities. In a typical embodiment, a rewards program may offer incentives to consumers to purchase goods and services or engage in non-monetary transactions in accordance with rewards program rules. The rewards program may be sponsored by one or more of resource providers and other entities, including merchants, shopping centers, non-retail entities, reward handlers, policy makers, and third parties interested in modifying human behavior.

The present rewards system enables disparate resource providers to award to qualifying consumers a reward including one or more of a plurality of universal vouchers exchangeable for a reward, wherein a recipient may aggregate said vouchers received from disparate rewards programs to obtain at least one desirable reward.

The system utilizes a unique universal transaction associating identifier (a UID120) to identify transactions in common within a rewards program. Embodiments of the present disclosure include a method, a system, and an apparatus for processing one or more of a consumer identifier and a digital data string to generate a UID120. A UID120 is associated with a "unique user identifier" as disclosed in U.S. patent application Ser. No. 12/942,693.

Embodiments of the present disclosure provide a number of advances. One advance would enable disparate merchants to participate in a secure electronic multi-provider rewards processing system which operates parallel to, and not by or dependent upon, a payment processing system. Another advance would enable rewards processing, including transaction identification and data capture, without payment processor-imposed requirements and rules. Yet another advance would enable disparate merchants to participate without regard to any merchant's relations with its own payment processor. Another advance would enable merchants to control (i) the volume of rewards issued, (ii) an adjustable reward qualifying threshold, (iii) timing of rewardable consumer behaviors, and (iv) reward system costs. An advance would facilitate customer sharing among merchants, drive consumers to and among merchants, and reward best customers for their desired behaviors. Others advances would enable merchants to bid competitively to provide rewards as a risk-free, low cost marketing method to drive traffic. An advance would enable a larger provider market, including merchants as well as non-retailers from many industries, to offer incentives/rewards in a common electronic reward processing system.

Other embodiments provide advances that enable a consumer to earn a compelling reward for one or more qualifying behaviors without enrolling and meeting other requirements imposed by a merchant's payment processor. Such embodiments allow a consumer to use any payment method, card, or device to pay in trying to qualify for a reward and enable a consumer to obtain a broader choice of rewards, including desired experiential and unconventional rewards, using universal vouchers issued by diverse reward issuers, wherein the vouchers are exchangeable for rewards. Various embodiments provides advances that would motivate a consumer to obtain a much-improved reward by aggregating universal vouchers received from disparate rewards programs for a single more valuable/appealing reward.

Conventional rewards systems typically require a consumer account, consumer identification, and the like. While a consumer account is required in most conventional reward systems, in embodiments of the present disclosure the consumer account is replaced by a universal transaction associating identifier (hereafter called a "UID120") for reward processing purposes. According to various conventional reward or loyalty programs, transactions must be performed using a consumer account associated with the consumer, whereas in the present disclosure a UID120, and not a consumer account or an identified consumer, can be associated with one or more transactions in common, wherein transactions associated with a UID120 are processed differently, in different steps, and in a differently structured system. A UID210 includes various properties, methods of generation, requirements, elements, purposes, and economic results, yielding advances described herein. U.S. patent application Ser. No. 12/942,693 provides methods to capture transaction data which may be "transmitted to a unique user identifier".

Another embodiment provides an advance that would provide a UID120 which associates disparate transactions at one or more resource providers. An advance would eliminate any requirement of a specific payment method, a consumer's enrollment, a card, an account, or a personal identification, as restrictive and objectionable methods to identify transactions. An advance would enable a consumer to use one of a plurality of consumer identifiers including a phone number, a card number, and other forms of identification to enable generation of a UID120. An advance would enable a UID120 to permit anonymity wherein the UID120 is not necessarily associated with a consumer's behavioral history or personal identity. An advance would provide for a consumer to change a UID120 from time to time in different rewards programs, preventing undesired tracking.

Merchants often feel bound to an electronic payment processor for PCI DSS compliance and technical reasons, and because switching processors may be costly and difficult. Thus a merchant may feel bound to its processor's rewards system which effectively precludes valuable marketing opportunities. All entities that handle sensitive data, and all merchant system elements, are subject to PCI compliance, security measures, audits, and costs. PCI DSS promotes encryption and suggests tokenization as an added security layer. Among the deficiencies associated with payment processors which concurrently operate rewards systems, a merchant may be forced to adopt a specific encryption and token embodiment based on what its payment processor requires, resulting in perceived "vendor lock-in" and often posing a challenge in changing payment processors. An advance would enable each merchant to participate in a rewards system comprising multiple disparate merchants without constraints associated with each merchant's payment processor's security methods, conflicting disparate encryption algorithms, incompatible vendors, equipment, and other requirements which may exist among multiple merchants in a group. A further advance would enable disparate merchants to participate in a PCI DSS-compliant rewards system offering enhanced marketing capabilities.

In an advance, a reward processor in the present system need not be a branded payment processor nor do transactions need to be affiliated with a payment processor, avoiding this severe limitation.

Conventional payment processors are generally not motivated to undertake certain functions, such as organizing disparate including non-enrolled merchants in marketing groups, or operating a competitive reward provider market that promote redemption traffic to reward providers. An advance would provide such added functions, given that disparate merchants rarely organize collective rewards programs not dependent on electronic payment processors. Other rewards programs not operated by a payment processor tend to be sponsored by individual merchants for their own benefit using their own POS systems, not by disparate merchants who lack electronic links in a common network. Prior art piggybacks onto payment processing systems because of the absence of alternative electronic solutions, not because payment processing itself is required for reward processing.

Data transmitted to a payment processor typically contains a total for payment authorization purposes without differentiating the payment total from a reward-eligible amount that excludes reward-ineligible charges. An advance would provide for a merchant to itemize only reward-eligible charges, enabling a distinct reward-related data stream containing those charges to be transmitted to a reward processor independently of different data transmitted to a payment processor which may include a different total for a different purpose, e.g., credit authorization, and further enabling product-specific marketing in an electronic reward system.

Some conventional reward program-processing can be delayed, wherein the results do not occur in real-time and wherein a notice indicating a reward has been awarded is sent and the reward is delayed until after funding is received in a complex funding process. An advance would provide to a consumer an immediate reward at the merchant's POS, and if rules are unmet, an electronic message including useful information about how much spending is required to qualify, a list of merchants at which to qualify, and reward-qualifying coupons as incentives, wherein a consumer may get both a discount and a reward by using a said coupon. A further advance would provide a simpler reward funding method, imposing no reward delay.

Conventional rewards programs often include poor selection of unappealing rewards which are offered through only a limited number of merchants enrolled with a particular payment processor to a limited market of eligible consumers satisfying restrictive rules. An advance would provide more attractive and motivating rewards from a greater variety of resource providers to a larger market of consumers, while giving access to improved marketing methods among the greater variety of resource providers.

An example rewards program may attempt to modify shopping behavior through rules requiring a consumer (i) to purchase at least $120 worth of products and services within a four-week period within a group of merchants, (ii) to engage in at least three transactions of at least $20 each in a group of merchants within a week, or (iii) to purchase lines of products produced by two or more enrolled manufacturers. In another example, a reward handler may join with a shopping mall owner, wishing to modify consumer behavior in its mall, to operate a rewards-based shopping promotion wherein the rules are configured to entice consumers to patronize multiple retail tenants or to visit the mall during slow hours or days.

A rewards program may be designed to motivate various behaviors relating, for example, to shopping, employee productivity, conservation, education, attendance, weight loss, etc. Each rewards program imposes specific rules which must be satisfied before a consumer may be issued a reward. This specification hereinafter refers mainly to shopping behavior, however the system may apply to any human behavior subject to modification by employing rewards or incentives, wherein qualification for a reward may be processed as disclosed herein.

Nomenclature

To explain the nomenclature of reference numerals used in the Figures and described in the specification, a lower case letter in parenthesis is intended to mean an integer variable having a value from 1 to the capital case of the lower case letter, which value may be large (i.e., approaching infinity). Thus '(b)' is intended to mean that the integer 'b' may have a value from 1 to B, etc. As such, drawing elements 108, 110, 112, 120, 122, 126, 130, 188, 190, 192, and 194 in FIG. 1A are illustrated as a singular item, but indicate one or more elements may be present. For example, resource provider 110($n$) is one of a possible plurality of resource providers, where n may range from 1 to a large integer. In another example, rewards program database 194($w$) is one of a possible plurality of rewards program databases, wherein each may be associated with a different rewards program. Use of the lower case letter shall be indicated only in the first reference of an element and all references thereafter are intended to include the lower case letter, which may not be expressly indicated in the specification. For example, consumer 108 may refer in each case to consumer 108($p$). Further, numbered arrows represent the transfer of money or data, including, but not limited to, financial and non-financial transaction data and messages.

Overview of the Rewards System and Definitions

FIG. 1A is a diagram depicting an example reward processing system 100 (a network) that includes, among other entities, at least one consumer 108($p$), at least one resource provider 110($n$), at least one resource provider group 130($g$), and at least one reward handler 112($h$). In addition, system 100 may include at least one resource provider transactions database 188($v$), at least one identifiers database 190($u$), at least one reward handler's transactions database 192($v$), at least one rewards program database 194($w$), at least one consumer interface 186 which may include a printer 180, as well as at least one universal transaction associating identifier 120($r$) (a UID120) or at least one identifier 122($f$) (a CID122). Each said UID120 and CID122 may be associated with at least one object 126($q$).

Figure 1B:
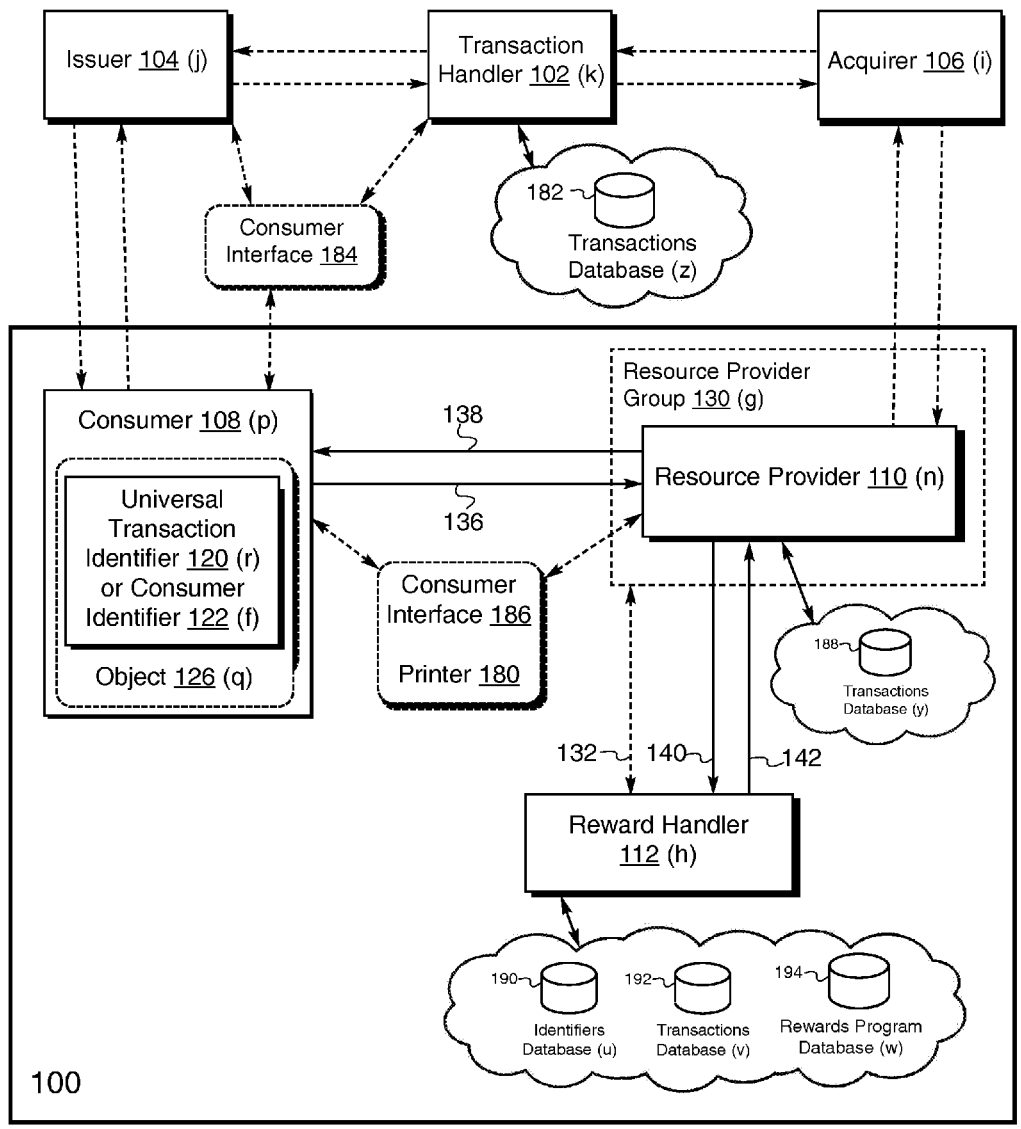
FIG. 1B illustrates one embodiment of an electronic reward generation system for resource providers, including payment processing.

In various embodiments, as illustrated in FIG. 1B, when payment processing occurs in a transaction, the system 100 is identical to that shown in FIG. 1A while also interfacing with a payment processor which is well known in the art, including one or more of a transaction handler 102($k$), an issuer 104($j$), an acquirer 106($i$), and a third party processor (not shown) (herein collectively called a "payment processor" and a "102/106"). Payment processing may include at least one transaction handler's transactions database 182($z$), and at least one consumer interface 184 for payment-related functions. A rewards service associated with a payment processor, if any, may operate independently of rewards system 100.

Figure 8:
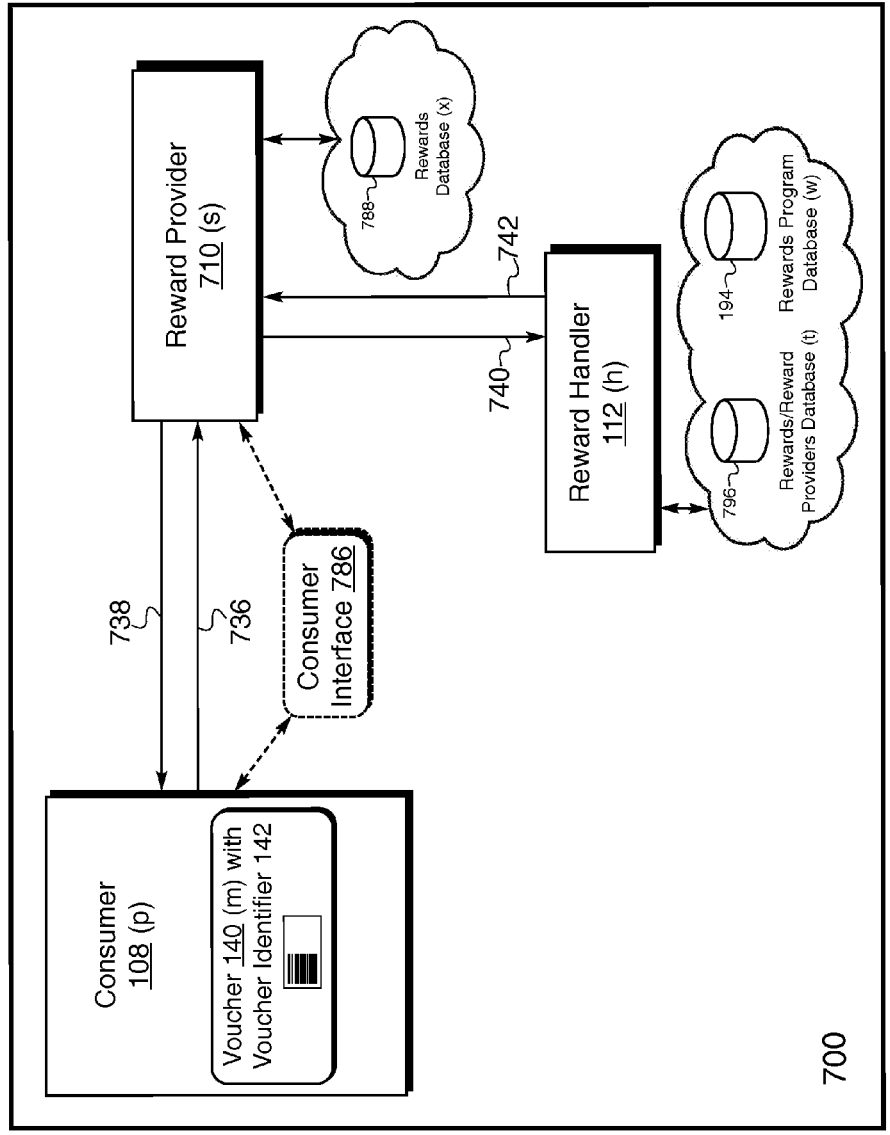
FIG. 8 illustrates one embodiment of an electronic reward redemption system based on vouchers.

Referring now to FIGS. 1A/1B, a consumer 108 is any person or persons who (i) engages in one or more transactions in system 100, (ii) uses a UID120 or a CID122, (iii) qualifies or tries to qualify for a reward, or (iv) receives or redeems one or more rewards or vouchers 140($m$) (as illustrated in FIG. 8). A consumer 108 may include one or more of a customer, a client, a visitor, a patron, an individual, a family, a group, a company, an organized entity, and any reward or voucher recipient or redeemer.

In various embodiments, a consumer 108 may use a consumer 108 apparatus wherein the consumer 108 apparatus may be configured by hardware and software for one or more system 100 functions including to (i) engage in reward-eligible transactions, (ii) obtain a UID120, (iii) transmit and receive system information, (iv) receive and redeem a reward, and (v) for other purposes. A consumer 108 apparatus may include a mobile device, a cellular phone, a computer, and a transaction or network device connected to a resource provider 110 or a resource provider 110 website.

A resource provider 110 shall include a merchant, a shopping center, a vendor and a provider directly or indirectly of goods or services to consumers, a non-retailer entity, a business, and any entity offering incentives in system 100 for transactions or desired behaviors associated with a consumer 108. In various embodiments, a resource provider 110 may include a restaurant, a department store, a chain store, a franchise store, a freestanding store, and a shopping center store. In various embodiments, a resource provider 110 may include an owner and an operator of a kiosk, a vending machine, a ticketing machine, an automated teller machine (ATM), and the like. In various embodiments, a resource provider 110 may consist of one or more of an accessible business location including a physical storefront, a website, a booth, and the like. In various embodiments, a resource provider 110 may include a manufacturer, a distributor, an agent, a broker, a producer, a marketer, and a service provider. In various embodiments, a resource provider 110 may include a nonprofit organization, an institution, an association, an organization, a sponsor, an employer, a contractor, a sole proprietor, a website host, an operator of a marketplace, and a government entity at any level. In various embodiments, a resource provider 110 may include a payment processor, a payment association, and a payment gateway in conjunction with or independently of a merchant or business for whom the payment processing entity processes payments, wherein a submitted payment or an authorization request to the payment processor, etc. may be reward-eligible. In various embodiments, a resource provider 110 may include an individual who wishes to reward behavior among friends, in a social network, and for any purpose. In various embodiments, examples of a resource provider 110 include a provider of goods or services in one or more of a profession, an endeavor, and an industry including financial services, retail, communications, transportation, automotive, health care, education, employment, energy, utility, advertising, media, market research, real estate, electronics, Internet services, food, restaurant, grocery, pharmaceutical, social networking, charity, legal, travel, hospitality, gaming, and entertainment.

A resource provider group 130 consists of one or more of a plurality of disparate resource providers 110 associated with a rewards program. A group 130 may consist of a shopping center 130, wherein a shopping center includes any venue, center, zone, shopping mall of any type or size, and grouping of merchants engaging in consumer 108 transactions or otherwise organized for marketing purposes. A shopping center includes a mall, a grouping of freestanding stores, an organization, an association, a market, and an entity which includes or represents a plurality of resource providers 110. A shopping center may or may not consist of geographically contiguous merchants. A group 130 may further consist of resource providers 110 located in a region or location including a zip code, a latitude and longitude, a radius from a location, a business or commercial zone or district; a transportation hub, an auto row, an exhibition center, and the like. In various embodiments, one or more of a resource providers 110 database (not shown) may identify resource provider groups 130, participants 110 per group, locations, and the like, or similar records may be recorded in transactions database 192 or another database.

A resource provider 110 apparatus may be of any type configured for merchant, business, or online operations and transactions; payment handling including billing; transmitting, receiving, detecting, outputting, and communicating messages; processing and storing data; accounting and inventory management; networking; and the like. Said functions may include detecting, reading, writing, transmitting, receiving, issuing, and printing of a UID120, a CID122, an XID124, a voucher 140, and an object 126. A resource provider 110 apparatus may include a server, a POS terminal, a card reader, a scanner, an NFC (contactless) transponder, a printer 180, an interface 186, a database, a website, etc. In various embodiments, a consumer apparatus may perform the functions of the resource provider apparatus including transacting, generating and receiving transaction data, generating and receiving messages, and receiving and redeeming a reward. A consumer apparatus may include one or more of a computing device, a cellular phone, a mobile device, and the like. A consumer apparatus may further include one or more of NFC (contactless) and RFID technology, a secure element, hardware components, software, operating system, browser, and other technology to perform system 100 functions, Some non-POS resource provider 110 apparatuses may include a kiosk, an ATM, a ticketing machine, a vending machine, a mobile device, a cell phone, a dongle, and an issuance apparatus as set forth in U.S. patent application Ser. No. 12/942,693.

A reward handler 112 is at least one of a plurality of entities which processes one or more reward-related transactions, qualifications, rules, rewards, vouchers, redemptions, behaviors, and bids, and engages in elements, steps, and methods in system 100. A reward handler 112 may include one or more of an independent reward processing entity 112, a resource provider 110, a resource provider group 130 such as a shopping center, a reward provider 710, a payment processor, a rewards program rule implementer, a string generation processor, a transaction associating identifier generator processor, and a third party entity. Functions of a reward handler 112 may be divided among several entities.

A reward may be any inducement or incentive which serves to modify human behavior for any purpose, including any incentive, consideration, value, recognition, information, or benefit. A reward may include a good, a service, a meal, food, an experience, entertainment, an entry (including at an event or in a sweepstakes), a gift card, a ticket, a coupon, a discount, cash or cash equivalent, a credit, cash back, points, miles, and data. Data may include a download (e.g., a movie, music, or image) or a service such as analyses, information, know-how, advice, and news. A reward may consist of one or more items, partial items, enhancements, etc. A reward may be tangible, intangible, real or ephemeral. A reward includes a universal voucher 140, which may consist of an electronic voucher 140, a physical voucher 140, or other representation or token of a reward.

A transaction is a behavior or act associated with two or more entities, including any purchase or exchange of money or value for a good, a service, an experience, etc. A transaction further includes any behavior or act including non-monetary acts, interactions, engagements, and exchanges undertaken by a consumer 108, including to satisfy rules in a rewards program as provided herein such as by completion of a survey, by visiting a shopping center, by using a device, and by engaging in a session for any purpose, such as trying a product or playing a game.

A transaction in common refers to one of a plurality of transactions in a rewards program.

A universal transaction associating identifier 120($r$) (a UID120) shall mean a unique string used to identify or associate transactions in common in a rewards program in system 100. The purpose of a UID120 is to serve as a universal transaction associating identifier wherein a UID120 may be used for any useful purpose. A consumer 108 may obtain a UID120 by various methods or may instead use a CID122, wherein system 100 then generates a UID120 for reward processing purposes as provided herein. A UID120 may be one of 1) a newly generated UID120 in a first transaction in a rewards program, 2) a self-generated UID120 in system 100, wherein the UID120 may be disseminated by various methods by authorized entities including embedded in an object 126, and 3) a previously generated UID120, wherein the UID120 is stored and retrievable in a database. A UID120 is universal in the sense that virtually any suitable consumer identifier (i.e., a CID122) may be presented at a transaction for generating a UID120. UID120 characteristics and methods of generation are more fully described below.

A consumer identifier 122($r$) (a CID122) shall mean a first consumer identifier or form of identification in a form originally presented by a consumer 108 in a transaction. The purpose of a CID122 is to provide an initial data set so as to generate an XID124 and then a UID120, wherein a CID122 serves as a predecessor element in a process for generating a UID120 when a consumer 108 does not present a UID120. A consumer identifier 122 is further described below.

An identifier 124 (an XID124) shall mean a processed CID122, that is, a string after one or more of a conversion, a digitization, a combination with additional data, and other transformation by processing by a string generation processor of a CID122 into a digital format suitable to generate a UID120 by methods described below. The purpose of an XID124, which exists only within system 100, is to serve as an intermediate element in a process for generating a UID120. An identifier 124 is further described below.

An object 126 shall mean an object which contains, encodes, embeds, or is associated with at least one of a UID120, a CID122, a voucher 140, a source of identification, and a digital string (collectively a "string"), wherein an object detector may detect, read, or record a string or data associated with an object 126 and wherein the string or data is included in reward-related transaction data. An object 126 is further described below.

A common transaction associating identifier shall mean a transaction associating identifier, including at least one of a UID120, a CID122, and any method of identifying a transaction, which is presented at each transaction in common in a rewards program and is recorded directly or in a processed form in a system database. The rewards system may associate multiple transactions in common by associating a common transaction associating identifier with the transactions corresponding to a rewards program in the system database. The same common transaction associating identifier or a different common transaction associating identifier may be used in different rewards programs.

A functionally equivalent transaction associating identifier shall mean a transaction associating identifier, including a UID120, a CID122, and an XID124, which in at least some cases (i) may exist, (ii) may be used, (iii) may be recorded in a database, and (iv) may serve its function in one of several forms, formats, versions, fields, and records, wherein each variation is deemed "functionally equivalent" as may be appropriate for its intended use. For example, a version of a UID120 may exist in a secure database, while a public version may be embedded in an object 126 after tokenization.

A consumer interface 186 is a display, for messages, which may be associated with a resource provider 110 apparatus such as a POS system or terminal display screen, or a consumer 108 apparatus such as a computer or mobile device screen. A printer 180 may serve as part of consumer interface 186 wherein a message including a UID120, a voucher, a receipt, a bar code, and the like may be communicated or conveyed as printed matter.

Resource provider transactions database 188, identifiers database 190, reward handler transactions database 192, and rewards program database 194 are described below in reference to FIGS. 4A, 4B, 4C, and 4D.

In reference to FIG. 1B, a payment processor may process a transaction including a credit/debit card payment and generate a message, e.g., an authorization. Payment processing entities, steps, elements, and databases are known in the art and are not further detailed here. System 100 does not itself process payments, however a payment processor may do so in at least some system 100 transactions, wherein a reward may not be processed without a payment processor communication to consummate a system 100 reward-related transaction.

Details Re: Universal Transaction Associating Identifiers, Related Elements

Further in reference to a CID122, a CID122 shall mean a first consumer identifier or source of identification including at least one of a digital string associated with a consumer 108, an object 126 associated with a consumer 108, a digital string associated with an object 126, a consumer 108 account, and any presented consumer identifier not necessarily identifying the individual 108 personally or any account. A digital string may include one of a value, a code, a token, a data entry, and a digitized representation of a data source. Any source of identification which is a digital string, which contains a digital string, or which is subject to digitization into a digital string, and which may be presented at each transaction in a rewards program, may be used as a CID122. A CID122 may consist of one or more of a plurality of identification types including a phone number, a card (including a credit, debit, loyalty, bank, library, etc.), an identification sheet, a biometric reading (a facial image, a fingerprint, a vocal input, etc.), a passport, a driver's or vehicle license, a PIN, an account number (e.g., tied to a utility or a card), a manual entry (a keypad entry, a signature, etc.), a mobile or other device identifier, an IP address, a serial number, an e-mail address, a social network address, a graphic image, a photograph, and any other useful source of identification. In various embodiments, a said source of identification is issued by a third party. A CID122 is processed merely as a digital string, and not for example as an account number, and is not used as an account number. Any identification of a person, an account, an object, or similar association is incidental to the functions of a CID122 and a UID120 in system 100. In various embodiments, a consumer 108 may request a system 100-generated UID120 in lieu of presenting a CID122. A CID122 is included in reward-related transaction data. U.S. patent application Ser. No. 12/942,693 provides for capturing such data including in claims 4, 21, 29, 30, and 31.

Further in reference to an XID124, features of an XID124 include: (i) an XID124 is typically generated by a string generation processor at a resource provider 110 apparatus by a computer implemented process including a proprietary algorithm typically supplied by a reward handler 112; (ii) a functionally equivalent XID124 is reliably generated from a given CID122 wherein a consumer 108 may present the same CID122 at any resource provider 110 apparatus for transaction identifier purposes to generate an XID124; (iii) in a typical embodiment, an XID124 creates a unique string which differs from a CID122 wherein the XID124 is processed and includes additional data; (iv) an XID124 adds a layer of security to protect a CID122 from fraudulent use; (v) an XID124 theoretically can regenerate a CID122 if the processing algorithm is known, and must be further processed into a UID120 to remove that capability; (vi) in the absence of fraud, an XID124 is useless outside of system 100 and is not usable for the originally intended purpose of a CID122 such as for credit card use; (vii) in at least some cases, an XID124 may utilize a standardized format for ease of use, in contrast to the diverse formats of various types of a CID122; (viii) in at least some cases, an XID124 is a composite string including additional data which may be derived, for example, from one of a single field and multiple fields or columns in a database, wherein the additional data is useful for various purposes including analytics and secure unique string generation and wherein the additional data may not be contained in a CID122; (ix) in a typical embodiment, an XID124 is transmitted from a resource provider 110 apparatus to a reward handler 112 apparatus for further processing (including transforming into a UID120) and recording, and for storing in a secure database such as identifiers database 190; and (x) an XID124 may be indexed and is searchable, including for additional data. In various embodiments the role, processing, or function of an XID124 may be incorporated into one of a CID122 and a UID120, wherein a separate XID124 is not generated, provided that the functions of an XID124 are satisfied in the process of generating a UID120.

Further in reference to a UID120, features of a UID120 include: (i) a UID120 is typically generated by a transaction associating identifier generation processor including a reward handler 112 apparatus by a computer implemented process including a proprietary algorithm; (ii) a functionally equivalent UID120 is reliably generated from a given CID122 and a corresponding XID124 wherein a consumer 108 may present the same CID122 at any resource provider 110 apparatus for transaction associating identifier purposes; (iii) a UID120 creates a unique string which differs from a CID122 and an XID124; (iv) a UID120 cannot be used to regenerate a CID122, thereby eliminating PCI DSS compliance problems, costs, and liabilities; (v) in at least some cases, a UID120 may employ added security methods including encryption, salting, and tokenization; (vi) a UID120 is useless outside of system 100 and cannot be used for the original purpose of a CID122 such as credit card use; (vii) in at least some cases, a UID120 may use a standardized format for ease of use; (viii) in at least some cases, a UID120 is a composite string including additional data derived, for example, from one or more of a single field and multiple fields or columns in a database, said additional data useful for various purposes including analytics and secure unique string generation, which data may not be contained in a CID122 or an XID124; (ix) a UID120 is recorded in a database including the identifiers database 190; (x) all fields, columns, and data associated with a UID120 are regarded as part of the UID120; (xi) a UID120 may be indexed and is searchable, including for additional data; and (xii) a reward handler 112 can determine by searching the transactions database 192 if a current UID120-linked transaction is associated with a previous UID120-linked transaction in common in a rewards program. A UID120 is included in reward-related transaction data. In a typical embodiment, to serve its functions, a UID120 is not intended (i) to employ sources of identification or consumer identifiers specifically of a person; (ii) to be used for common issuer purposes such as payment and credit authorization; (iii) to authenticate a consumer 108's identity; (iv) to validate or authorize a payment or transaction; (v) to be associated with an account; or (vi) to require enrollment or a prior relationship. Any of several UID120 generation methods may be used including the simplified example shown in FIG. 3. A UID120 may consist of at least one of (i) a digital string generated by a computer implemented process from all or part of an XID124 string, which is generated at least in part from a CID122 (e.g., in FIG. 5B at block 542), and (ii) a digital string generated without reference to an outside source (e.g., in FIG. 5B at block 544), wherein the UID120 may be included in a manufactured object 126 as described below, or otherwise disseminated.

Further in reference to an object 126, an object 126 may consist of one of a portable physical object and an article of manufacture containing a non-transitory machine-readable medium wherein the medium contains a string and is attached to, contained in, adhered to, or associated with the object 126. In various embodiments, an object 126 may consist of at least one of a device including a swipe card, a cell phone, a mobile device, a computer, a programmable tag, and an electronic device. In various embodiments, an object 126 includes any method, mechanism, or device to generate, obtain, store, contain, transmit, receive, employ, replace, update, or enable use of a UID120, including by a hardware component, a peripheral device, a network device, an operating system, a browser, a software application, software instructions at any hardware level, a cookie, a security or encryption method, a transaction method, a game, and methods including software as a service (SaaS) and access to the cloud. In various embodiments, an object 126 may consist of at least one of an accessory, including an article of clothing, a key chain, a purse, a wallet, jewelry, glasses, and the like, each said object 126 containing a non-transitory machine readable medium. In various embodiments, an object 126 may consist of at least one of a printed sheet including a piece of packaging, an invoice, a mail piece, a piece of printed matter, and the like, containing a machine-detectible pattern including one or more of digits, alphanumeric characters, graphics, images, markings, printing, etc. In various embodiments, an object 126 may consist of any object containing at least one of a machine-detectible string and a pattern which may be convenient for a consumer 108 to present at a resource provider 110 apparatus to serve as a CID122. In various embodiments, an object 126 may be embedded in a person. In various embodiments, a string may be contained in a dual use object 126 including a device, a card, and an article of manufacture wherein the dual use object 126 may contain both a CID122 such as a credit card account number, and a UID120, wherein detection only of the UID120 may be required for system 100 purposes. In various embodiments, a dual use object 126 may transmit a CID122 such as an account number and a UID120 in a single event, for example, in an NFC-enabled transmission, the two forms of identification captured in one act and processed separately in different processing systems for a payment and a reward. Detection of a string, including a CID122 and a UID120, associated with an object 126 may occur at a resource provider 110 apparatus by physical, mechanical, contactless, optical, and other methods including by magnetic, near field communications (NFC), radio frequency (RF), scanning, optical character recognition, pattern recognition, and machine detection technology. U.S. patent application Ser. No. 12/942,693 provides for an "object detector" for receiving data.

Example Methods of Disseminating a UID120

A UID120 may be disseminated by various methods. Obtaining a UID120 does not require a consumer 108 to procure a specific device, use a specific consumer identifier or source of identification, or enroll, register, or have an account because alternative methods of obtaining a UID120 are available. However a said device, enrollment, etc. may already be in place if the consumer 108 uses a CID122.

A UID120 may be disseminated by one or more of a plurality of methods including 1) by one of a resource provider 110 apparatus and a third party apparatus including a merchant's POS apparatus, a kiosk, a vending machine, an ATM, and a ticketing machine; 2) in one or more objects 126 distributed by any method; 3) directly from a website on the Internet, and 4) by applications ("apps") provided in devices or downloadable from a website on the Internet; and 5) by an operating system, browser, cookie, and computer instruction. An object 126 may be produced and distributed by various methods, including 5) by a manufacturer in its products associated with payment technologies including swipe cards, mobile devices, and cellphones; 6) by a publisher, advertiser, or printer in any medium; 7) by a company in its customer invoices and mailings; 8) by an event producer or transit authority in its tickets; 9) by a food processor in its food products and packaging; 10) by a merchant in its receipts and marketing communications including physical and electronic receipts, e-mails, and messages; 11) by social media technology and methods; 12) by e-mail and other communication to a consumer 108's device; 13) by a sponsor, underwriter, promoter, or other entity engaging in a promotion; and 14) by other methods.

In various embodiments, a consumer 108 may obtain one or more UID120s for different rewards programs, and may replace or abandon a UID120 at will at any time, provided that a single UID120 (or a corresponding CID122) is used in all qualifying transactions in a given rewards program for associating transactions in common. In an advance, by the system and methods disclosed herein, the consumer 108 may maintain privacy and anonymity, avoid compilation of a history, and deter behavior tracking, wherein the frequent question of who owns the customer is answered: in rewards system 100, the customer owns the customer.

Computing Machine Architecture

Figure 2:
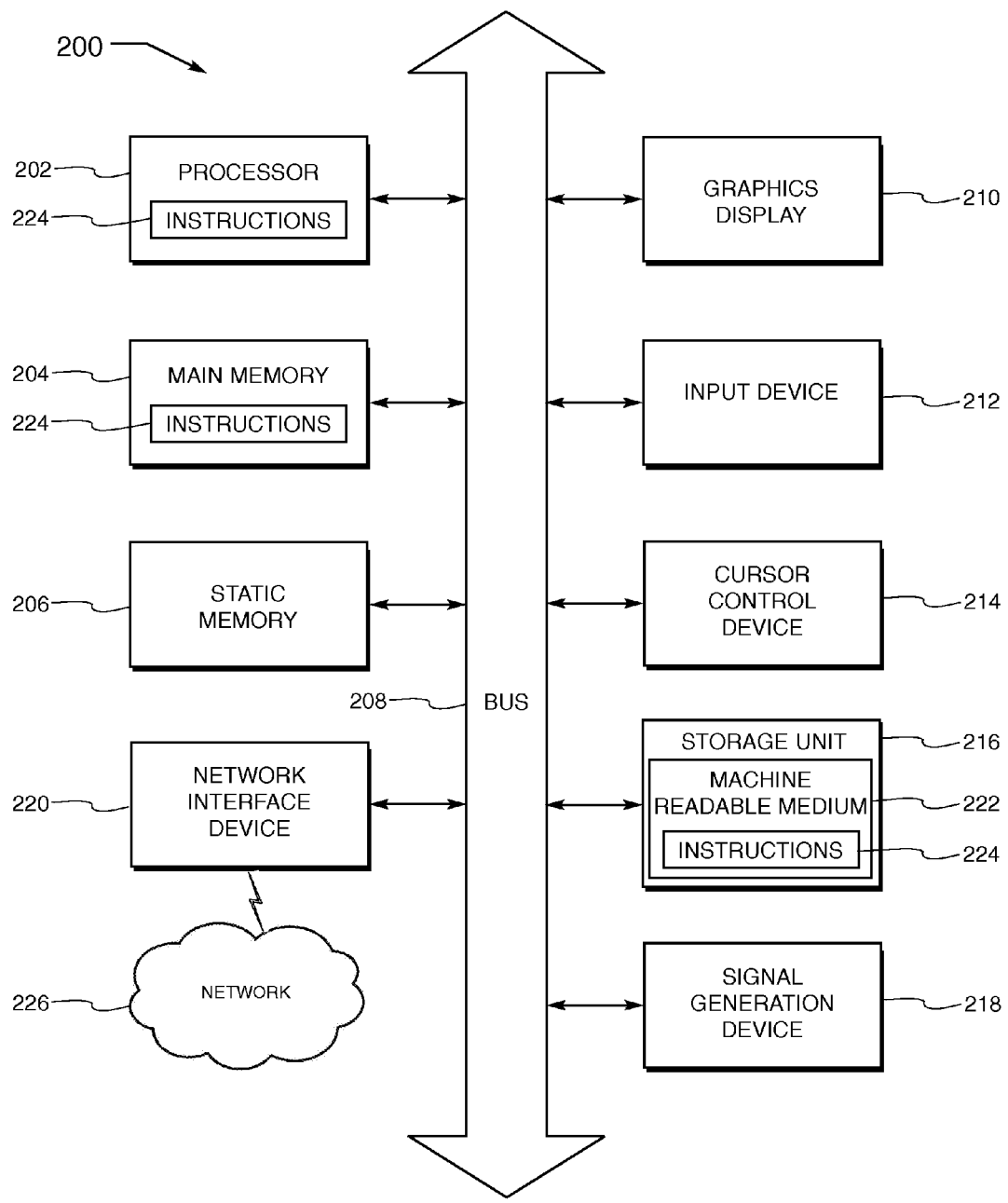
FIG. 2 illustrates one embodiment of components of an example machine able to read instructions from a machine-readable medium and execute them in a processor (or controller).

FIG. 2 is a block diagram illustrating components of an example machine (including an apparatus, an article of manufacture, and in some cases an object 126) able to read instructions from a machine-readable medium and execute them in a processor (or controller). This machine exemplifies apparatuses in system 100 including a resource provider 110 apparatus, a reward handler 112 apparatus, a consumer 108 apparatus, and a reward provider 710 apparatus. This example machine provides a context for machine structure when configuring processes as described herein. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a point of sale (POS) computing system or device, a mobile device, a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include an input device 212 (e.g., an alphanumeric keyboard, a scanner, a detector, an NFC transponder), a cursor control device 214 (e.g., a mouse, a trackball, a joystick, a touchscreen, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but is not limited to, data repositories in the form of solid-state memories, optical media, and magnetic media.

Example Universal Transaction Associating Identifier Generation Process

Figure 3:
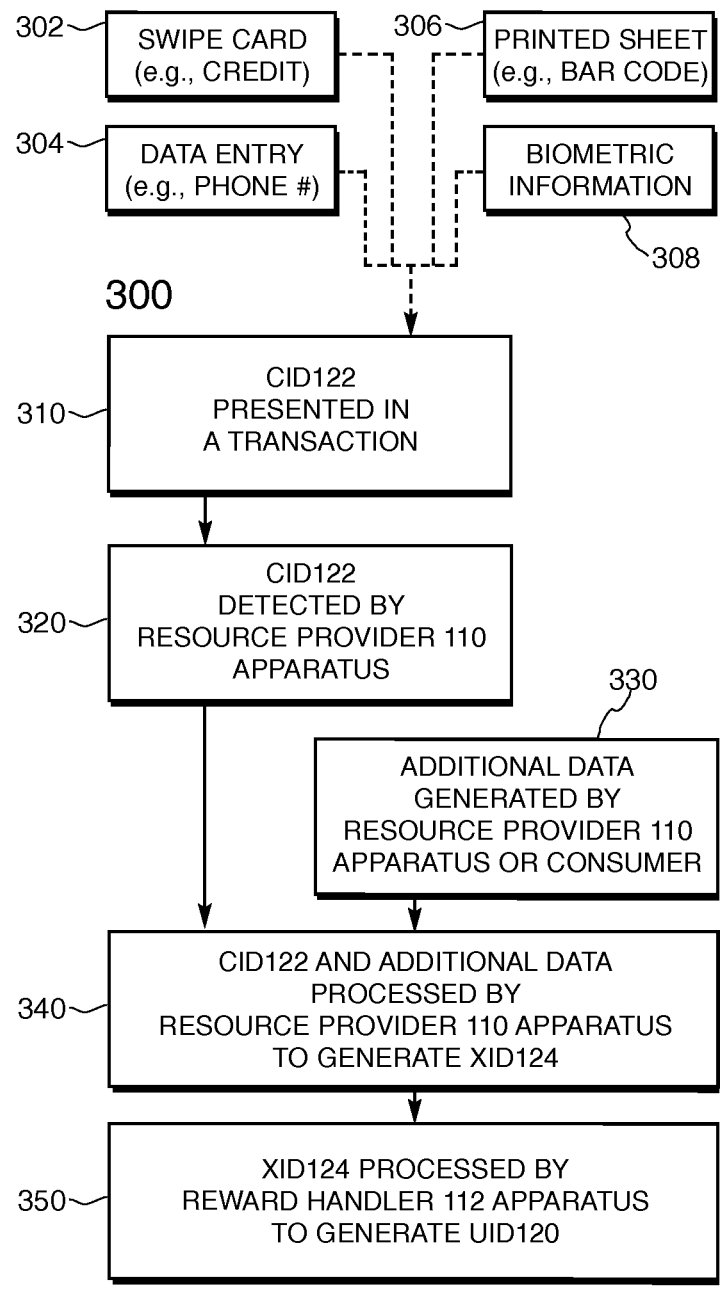
FIG. 3 is a flowchart illustrating an example process designed to generate a universal transaction associating identifier.

Referring to FIG. 3, a simplified example process 300 for generating a universal transaction associating identifier UID120 is illustrated. A consumer 108 may present any suitable CID122. Four types of a CID122 are displayed at process blocks 302 (a swipe card), 304 (a data entry), 306 (a printed sheet), and 308 (biometric information). At process block 310, the consumer 108 engages in a transaction and presents a CID122 as a first consumer identifier. At process block 320, the CID122 is read or detected by a resource provider 110 apparatus. At process block 330, at least one of the consumer 108 and the resource provider 110 apparatus generates additional data, e.g., the type of identification (credit card type, phone number type, etc.) and other data. In various embodiments, at block 330 the first consumer identifier, such as a graphic image, may be digitized to render detected data into the form of a CID122 string. At process block 340, the data from blocks 320 and 330 are processed by a string generation processor including the resource provider 110 apparatus by a computer implemented process to generate a second method of identification (an XID124), which comprises a unique string which is typically a composite string. At process block 350, typically after a transmission, including encryption and decryption, of the XID124 from the resource provider 110 apparatus, a transaction associating identifier generation processor including the reward handler 112 apparatus generates a unique universal transaction associating identifier UID120 by a computer implemented process. A detailed description of this process is provided in FIGS. 5A/5B.

First Example Implementation

Referring again to FIG. 1A/1B, in a first example embodiment, a rewards program host administrator such as the reward handler 112 organizes a group 130 consisting of resource providers 110 and arranges a rewards program within the system 100 (arrow 132). The program rules require purchases totaling at least $120 in a seven-day period for a reward to be awarded. A transaction occurring within the system 100 begins when a consumer 108 wishes to pay for goods or services offered by a resource provider 110 (arrow 136). The consumer 108 may patronize one or more of a plurality of resource providers 110 in the group 130, but need not transact at each or at any particular resource provider 110 unless the rewards program rules so require.

In a typical transaction, the resource provider 110 itemizes purchases and presents a total due to the consumer 108 (arrow 138). In various embodiments, itemization distinguishes reward-eligible from reward-ineligible items, as described below. The resource provider 110 further generates other financial and non-financial data. Other possible financial data may include sales tax, applied discounts such as coupons, and the like. Non-financial data may include a timestamp of the transaction, a store identifier, a payment method, a CID122 type, and the like.

The consumer 108 presents payment by one or more of a card, a mobile device, cash, and the like to the resource provider 110 as tender for the transaction. A typical consumer 108 payment device includes a non-transitory machine-readable medium including a non-volatile memory to store information such as an account number and name of the account holder. The payment method may be recorded in resource provider transactions database 188. In various embodiments, transaction data is captured by a detector in a 110 apparatus. At any time during the transaction, the consumer 108 may be prompted to present a UID120 or to indicate use of and present a CID122, including an object 126 or the said payment device, wherein the UID120 or the CID122 is detected. In various embodiments, when a CID122 is presented a UID120 is generated and associated with the transaction. In various embodiments, a payment may be processed by a payment processor as shown in FIG. 1B and as set forth in FIG. 5A, blocks 514, 516, and 580 to 594 inclusive, further described below. In various embodiments, disparate resource providers 110 in a group 130 may engage different payment processors.

As detailed below, in a typical embodiment, reward-related transaction data is compiled by the resource provider 110 and transmitted to the reward handler 112 for processing (arrow 140). Following processing, a reply is transmitted from the reward handler 112 to the resource provider 110 indicating qualification or non-qualification for a reward, and additional information (arrow 142). Upon qualification, determined by summing or assessing the spending in the previous and current transactions in the rewards program, for example totaling $125, and comparing the calculated result to the rules requirements of at least $120 spending in seven days, a reward is generally awarded to the consumer 108 (arrow 138). In various embodiments, the consumer 108 may elect instead to continue shopping, for example, to increase the reward.

In the first example embodiment, as further described below, an incentive is provided to modify the behavior, such as spending, of the consumer 108 using a UID120 in a rewards program in rewards system 100. As briefly discussed above, a given rewards program may be sponsored by one or more resource providers 110, a shopping mall, or a third party entity. Each program includes rules dictating conditions or actions required to earn a reward. The rules may differ for each rewards program, but are generally designed to provide incentives for certain behavior desired by the entities associated with the rewards program.

In the case of any rewards or incentives program, one or a subset of the entities may operate the program and track the information associated therewith including rewards program rules, UID120s, resource providers 110, groups 130, and reward-eligible transactions. In a typical embodiment, the reward handler 112 operates the program independently of a payment processor. Any competent entity may serve as a reward handler 112 and a rule implementer.

The above-described operational structure, use of UID120s, and differentiation of entity roles yield improvements enabling disparate resource providers 110 to participate in rewards programs without regard to constraints such as each resource provider 110's choice of a payment processor, the absence of said constraints enabling the unrestricted formation for collective marketing of diverse yet compatible resource provider groups 130 by organizing criteria including proximity (e.g., selected stores in a district), thematic affinities (e.g., fashion stores), target markets (e.g., females 18-45), compatible industries (e.g., travel agents, hotels, airlines); etc. In an advance, a resource provider 110 may participate in more than one theme-based group 130 in an area, enhancing its available marketing methods. In an advance, the formation of multiple groups 130 each with a different theme may enable unprecedented call-to-action marketing, co-promotions, sponsorships, etc., beyond what each resource provider 110 can do for itself or by participating in a rewards system operated by a payment processor including the deficiencies described above.

With continued reference to FIG. 1A, each entity hopes to receive a benefit by modifying the behavior of consumers 108 participating in the rewards program. Resource providers 110 may wish to increase consumer traffic, spending, and market share at their locations, and achieve more cost-effective marketing methods. A reward handler 112 may wish to increase the number of transactions to maximize fees and bolster traffic to increase the advertising value of system 100.

Additional Example Implementations

In yet other embodiments, the rewards program may be a multiple resource provider 110 (multi-merchant)-type rewards program designed to reward consumers for patronizing retail tenants associated with a shopping center (hereafter an "SC"), wherein the SC comprises a group 130. In this example, the SC owner may sponsor the rewards program in order to increase traffic and spending to help generate higher rents as well as to benefit retail tenants. The SC owner may have multiple SCs in various metropolitan areas, each SC having twenty or fifty or two hundred retail tenants. With continued reference to FIGS. 1A/1B, the consumer 108 may be presented information about the rewards program and may be provided an SC-issued rewards card comprising an object 126, each card encoded with a unique UID120. The rewards card 126 may be disseminated at no cost to any shopper at SC entrances and by other methods. Alternatively, the same rewards program may be associated with a card issued by any SC retail tenant wherein the identification data associated with the tenant-issued card 126 may serve as a CID122 and wherein the same card 126 may be presented at each transaction at any SC store regardless of the card issuer. A card 126 may contain one of a UID120 and a CID122, or both in a dual use card. Any said consumer identifier or source of identification is sufficient in system 100 to identify transactions in common within the SC, enabling a rewards program. In this second example embodiment, the multi-merchant rewards program rules require the consumer 108 to make purchases at any of two or more SC retail tenants 110 totaling a threshold value within a two-week period. The threshold value may vary according to the time or day of transactions, for example, all purchases made before 12 noon or anytime on a Monday may qualify for a reward if they total at least $100, while all purchases including at least one made after 12 noon may qualify if they total at least $120, encouraging consumers 108 to shop during slower periods early in the day. A transaction timestamp acquired at process block 514 enables such calculations by the rewards program rule implementer. The transactions are processed in the same manner as described above in the first example embodiment. In return for satisfying the program rules, the consumer 108 receives a reward of two $5 vouchers 140, totaling $10. The consumer 108 may redeem the received vouchers 140 within 60 days at any SC retail tenant 110 also serving in the role of a reward provider 710, thereby driving qualifying spending to some SC retail tenants 110 followed by redemption traffic often to other SC retail tenants 710, benefitting the SC owner as well.

In a third example embodiment, a non-retailer resource provider 110 including one or more utilities may promote desired customer 108 behavioral change by using one or more billing systems to provide an account number serving as a CID122 to assess multiple transactions, while a co-sponsoring company such as a home improvement chain store selling water/energy-saving products may serve as a reward provider 710, wherein rewarded customers 108 of the utilities may redeem reward vouchers 140 at any location of the chain store 710. For example, one or more of a water and a power utility 110 may cooperatively establish a water and energy conservation goal per household over a 12-month period, wherein customer 108 behavior is measured by units recorded in monthly household meter readings, each billing comprising a transaction, and may award vouchers 140 to each household satisfying rewards program rules which require consumption to be reduced by 10% as compared to the same period in the previous 12 months. Messages from each utility 110 to the reward handler 112 enable reward processing. Earned reward vouchers 140 may be recorded and then issued as an insert in a bill or by other methods. The utility firms 110 may achieve conservation goals while the chain store 710 may gain new customer traffic from voucher 140 redemptions. Alternatively vouchers from the utility and the SC rewards program described above may be aggregated to obtain a greater reward from the separate programs, the rewards programs being mutually beneficial in a unique rewards system.

In a fourth example embodiment, one UID120 may be issued to all members of a group of individuals such as a swim team or a group of employees, wherein transactions (behaviors) of all members are collectively assessed to determine behavior of a group. For example, two or more competitive teams may issue a single UID120 to each of their team members, each team using a different UID120, wherein the members engage in disparate transactions and wherein each team achieving a goal, in accordance with program rules, is awarded a reward.

In a fifth example embodiment, one or more of a plurality of individuals and organizations in a community may each serve as a resource provider 110 in respective rewards programs wherein, for example, a sole proprietor may award clients, a teacher may award students, a doctor may award patients, an auction operator (including online) may award bidders, a charity operator may reward donors or volunteers, and an event promoter may reward attendees, in each case the UID120 serving to identify transactions in common within respective rewards programs, wherein the aggregation and redemption by a consumer 108 of earned universal vouchers 140 from multiple programs provides novel mutually beneficial marketing and rewarding capabilities, critical mass, and consumer motivation, each reward provider 110 benefitting from the system 100 as a whole, where none is currently feasible in the marketplace. The consumer 108 may use the same UID120 or a different one in each rewards program, yet still aggregate earned vouchers 140.

Example Databases

Several databases are provided, including those shown in FIGS. 4A, 4B, 4C, and 4D.

Figure 4A:
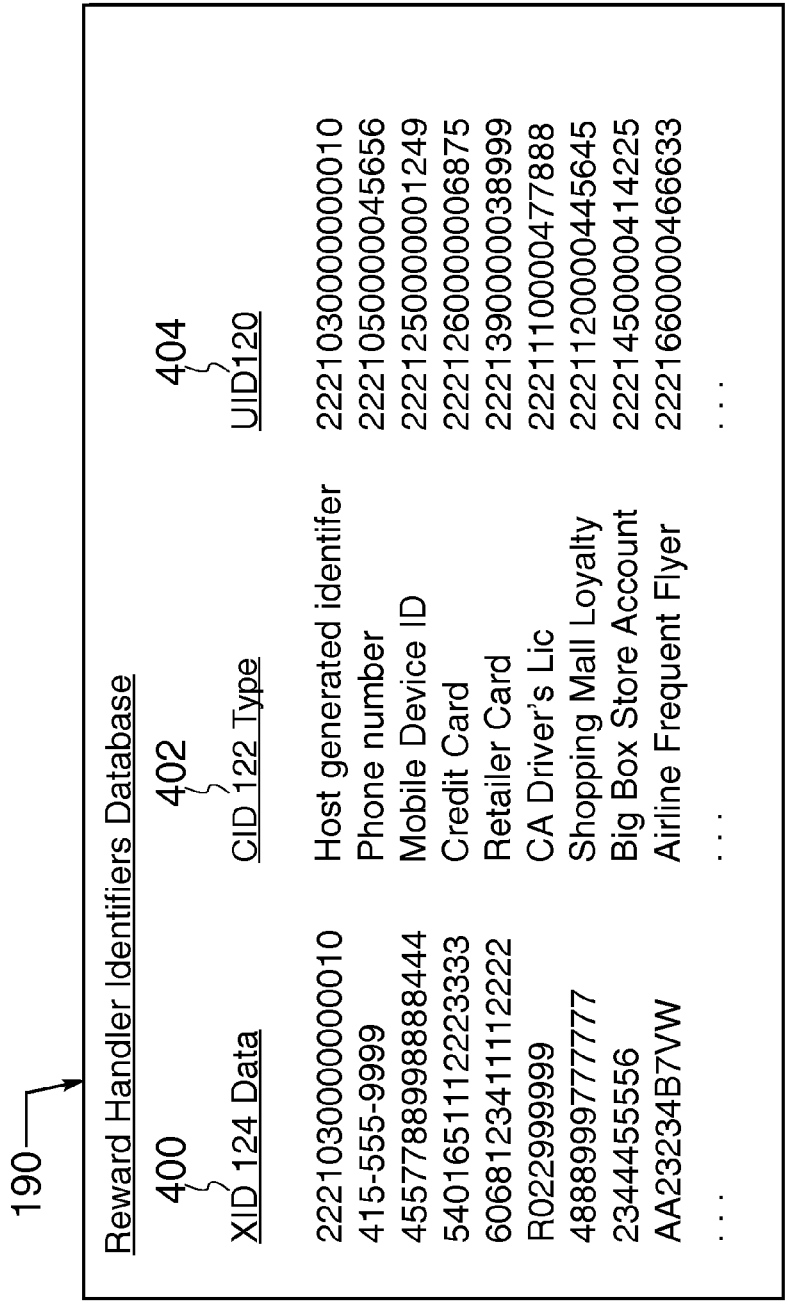
FIG. 4A illustrates one embodiment of example identifiers database that may form part of the system shown in FIGS. 1A/1B.

Referring to FIG. 4A an example identifiers database 190 operated typically by a reward handler 112 is illustrated in a table format. In a typical embodiment, identifiers database 190 is stored in a secure vault. Database 190 includes an XID124 data column 400, a CID type column 402, and a UID120 column 404. XID124 data column 400 lists consumer 108's XID124 data, typically received from a resource provider 110 after its generation, which consists of one of a string processed from a first consumer identifier (a CID122) and a UID120 previously obtained by a consumer 108. XID124 data column 400 may further comprise one or more columns (not shown), each column consisting of a different type of identifying or additional data, wherein the data in the columns may be combined to generate an XID124 and ultimately a UID120. Example XIDs in 400 include a UID120, a phone number, and an account number. CID type column 402 indicates the type of the XID data in 400, which is exemplified by a credit card type, a loyalty account type, a phone number type, and a host-generated identifier (a UID120) type. UID120 column 404 displays the corresponding UID120 generated by the transaction associating identifier generation processor, the generation process described below. The example UID120s shown are not indicative of real UID120s. UID120s in column 404 may consist of several components comprising a string, and may be divided into several columns (not shown). An identifiers database 190 may contain one or more functionally equivalent versions of a UID120, each of which may be retrievable and associated with one or more of a plurality of system 100 elements. Identifiers database 190 comprises a methodology and technology by which a UID120 may be retrieved for any CID122 presented by a consumer 108 (see FIG. 5B block 538). When no UID120 or XID124 corresponding to a said CID122 exists in identifiers database 190, a new UID120 is generated (at FIG. 5B block 542) and a corresponding record is entered in database 190.

Referring to FIG. 4B, an example transactions database 188 is illustrated in a table format. Transactions database 188 is operated typically by a resource provider 110 to record and store its own reward-related transaction data. Database 188 includes a reward-eligible transaction column 420, a UID120 column 422, an amount column 424, a timestamp column 426, a payment type column 428, and a vendor column 430. Other columns (not shown) may be added, including columns for reward-ineligible data, merchant data, and other data. Transaction column 420 lists all resource provider 110 reward-eligible transactions, typically for a time period such as a month. UID120 column 422 associates a UID120 with each transaction listed in column 420, wherein the UID120 is entered following receipt by the resource provider 110 when a UID120 is provided by a consumer 108 (at FIG. 5A block 514) or by a reward handler 112 (at FIG. 5B block 570). One or more of a column for a CID122 and an XID124 (not shown) may indicate an alternative source of identification associated with the transaction, however a payment-related CID122 and an XID124 with retrievable CID122 data are often expunged from resource provider 110 databases for security reasons, wherein a UID120 serves to record the transaction by a secure method not subject to PCI DSS compliance costs/issues. Amount column 424 indicates the reward-eligible total which is submitted to the reward handler 112, which may exclude reward-ineligible items and may differ from a transaction total submitted to a payment processor 102/106 for payment authorization. Timestamp column 426 provides time data, including the basis to determine if a transaction occurs within a rewards program period or in compliance with program rules. Payment type column 428 and vendor column 430 exemplify recorded additional data which may be desired by the resource provider 110, enabling analytics, etc. All or a subset of a given transaction record may be compiled, encrypted, and transmitted to the reward handler 112, as exemplified in FIG. 5A blocks 526, 528, and 530. In various embodiments, transactions database 188 is associated with the resource provider 110's accounting system, or other database.

Referring to FIG. 4C, an example transactions database 192, operated typically by a reward handler 112, is illustrated in a table format. In a typical embodiment, the database 192 contains data from transactions submitted to a reward handler 112 by resource providers 110 in groups 130 in multiple rewards programs in a time period (e.g., 12 months), enabling calculation or assessment of qualification for rewards across multiple disparate transactions, each transaction associated with a UID120. Database 192 includes a merchant (resource provider 110) column 450, a group 130 column 452, a transaction column 454, a UID120 column 456, an amount column 458, and a timestamp column 460. Other columns (not shown) may be added. Merchant column 450 lists merchant IDs, which may be associated with a particular store. Group column 452 indicates a group 130 in which each merchant 110 participates, wherein each merchant 110 may be a member of one or more groups 130. Transaction column 454 lists transactions associated with each merchant 110, each record correlated with a UID120 in UID120 column 456, a reward-eligible amount in amount column 458, and a timestamp in timestamp column 460. The reward handler 112 may associate a UID120 with a transaction and enter the UID120 in database 192 by steps shown in FIG. 5B, blocks 532 through 550 inclusive.

FIG. 4C further depicts a first example in which a consumer 108 with a UID120 labeled 2221260000006875 engages in three transactions on the same day, respectively with merchants labeled XXX, YYY, and ZZZ in column 450, each merchant 110 in the same group 130 and rewards program. Transaction amounts of $45, $50 and $30 total $125, rendering the holder of the UID120 2221260000006875 qualified for a reward, assuming the program rules set a spending threshold at $120 (in FIG. 4D at 492). In a second example, a similar calculation is made for the UID120 labeled 2221390000038999, on the next day wherein a different consumer 108 patronizes a different combination of two stores, also qualifying under the program rules. The consumer 108 may participate in multiple rewards programs associated with different groups 130, resource providers 110, and time periods in accordance with program rules.

Referring to FIG. 4D, an example rewards program database 194 is illustrated in a table format. Database 194 contains data for all rewards including vouchers 140 awarded to consumers 108 in accordance with program rules, each reward associated with a reward ID including a voucher identifier 142, as well as a UID120 and a reward provider 710 (shown in FIG. 8). Database 194 may also track voucher redemptions. In various embodiments, database 194 includes a reward ID or voucher identifier 142 column 480, a group 130 column 482, a resource provider (Merchant) 110 column 484, a UID120 column 486, an amount column 488, a timestamp column 490, a program rules column 492, a redeemed (voucher) column 494. Other columns (not shown) may be added, including for example columns for a reward provider 710, the value of a reward (e.g., a $5 voucher), a voucher expiration date, reward fees, and redemption terms. A rewards program rule implementer assesses qualification, wherein upon qualification and issuance of a reward, a record associated with each reward ID at column 480 is entered in database 194. Several reward IDs in column 480 may be associated with the same qualification event, for example, issuance of two (2) $5 vouchers 140 in one reward. It is assumed a large number of reward IDs will be listed.

Referring again to FIG. 4D, group column 482 identifies the group 130 to which one or more merchants 110 in column 484 belong. Merchant column 484 indicates each merchant 110 associated with transactions which collectively generate a reward. UID120 column 486 lists the associated UID120 per transaction in common. Amount column 488 specifies the reward-eligible total per merchant 110 associated with each reward, enabling a calculation of each merchant 110's share of associated fees as well as total spending per reward and other analytics. Timestamp column 490 provides data concerning reward eligibility for a particular reward program time period. Rules column 492 lists program rules under which each reward is issued. One example set of rewards program rules requires spending of at least $120 within a group 130 in a 7-day period. Redeemed column 494 indicates redemption of a reward, for example, when a voucher 140 is exchanged at a reward provider 710 which, for example, may occur after voucher 140 issuance and before a voucher 140 expiration date.

FIG. 4D further depicts a first example in which a voucher 140 with voucher identifier 142 labeled 999111111 is issued to a consumer 108 associated with a UID120 labeled 2221260000006875, based on a qualification consisting of three transactions on the same day (May 1, 2012), respectively with merchants XXX, YYY, and ZZZ, all said merchants 110 in a group 130 labeled 6110. Transaction amounts of $45, $50 and $30 total $125, which collectively satisfy rules in column 492 by exceeding the minimum qualifying threshold of $120 in seven days. Said voucher ID 999111111 is redeemed on Jun. 3, 2012. For voucher identifier 999111111, merchants XXX, YYY, and ZZZ consummated transactions of reward-eligible items totaling $45, $50, and $30, respectively, adding up to $125. The merchants 110's shares are 36%, 40%, and 24%, respectively, of the cost associated with that reward, assuming costs are proportional to spending each receives, which may be calculated based on data in database 194.

Example Rewards Program Process

Figure 5A:
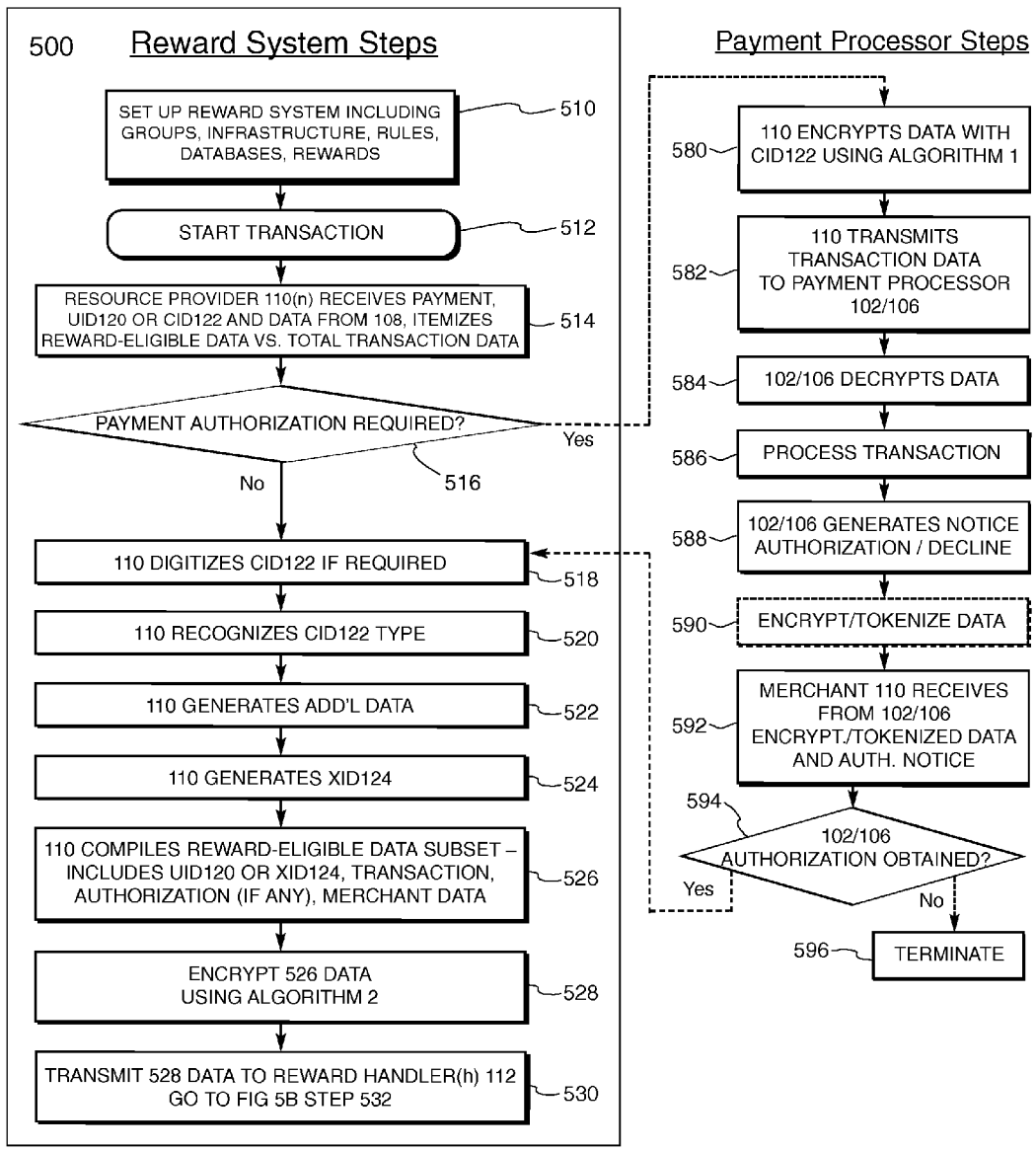
FIG. 5A is a flowchart illustrating an example process designed to modify consumer behavior through incentives offered through a rewards program.
Figure 5B:
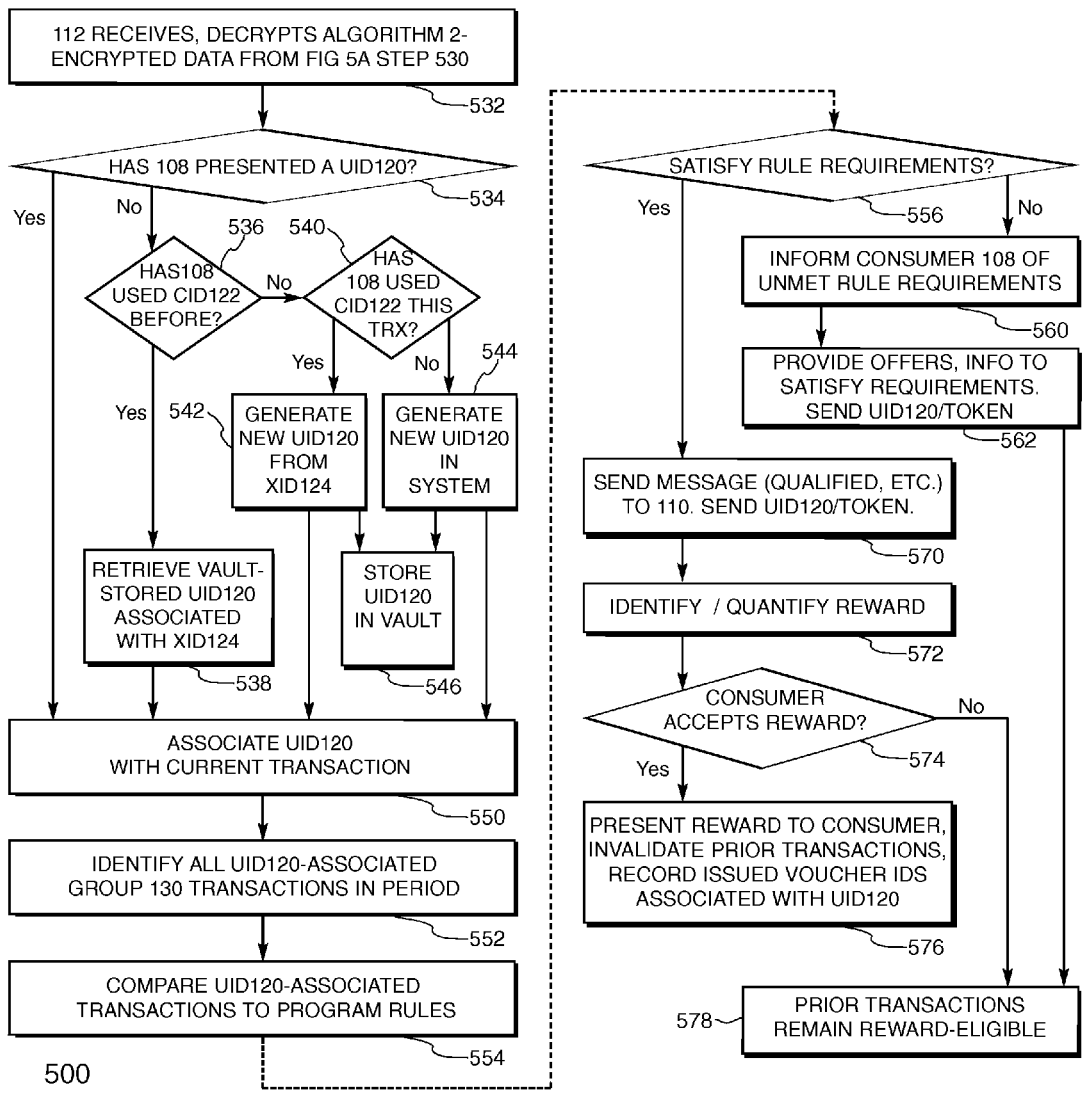
FIG. 5B is a flowchart, as a continuation of FIG. 5A, illustrating an example process designed to modify consumer behavior through incentives offered through a rewards program.

Referring to FIGS. 5A and 5B, an example rewards program process 500 is illustrated.

Referring to FIG. 5A, initially at block 510, prerequisite elements of system 100 are set up. In an example embodiment, said set up includes installing/configuring infrastructure including hardware, software, and a network, at least one reward handler 112, at least one group 130 including at least one of a plurality of resource providers 110, a rewards program, databases including those illustrated in FIGS. 4A, 4B, 4C, and 4D, a rewards/reward providers database 796(*t*) (illustrated in FIG. 8), and at least one reward provider 710 (FIG. 8). In various embodiments, as illustrated in FIG. 1B, the set up includes a payment processing methods for electronic payments which may be processed by a payment processor 102/106, wherein resource providers 110 may respectively have relationships with different payment processors 102/106.

Further in reference to block 510, prior to participating in a rewards program, a consumer 108 may obtain a UID120 from a resource provider 110, a reward handler 112, or any authorized entity including a distributor, manufacturer, or issuer of an object 126. A said UID120 is recorded in identifiers database 190. Alternatively, the consumer 108 may obtain a first consumer identifier (a CID122) by any method.

Further in reference to block 510, for each group 130, rewards program rules may be established and recorded at column 492 in FIG. 4D, wherein said rules are made known to consumers 108 and resource providers 110 by public disclosure including on a sign, a website, a mobile device, an e-mail message, a social network, an advertisement, and by other methods, wherein participants may be informed of reward qualification requirements for a given rewards program. Said rewards program rules may be programmable and adjustable from time to time including by remote methods, enabling a rewards program implementer to provide incentives for certain behaviors, promote timely spending, control system costs, manage reward volumes, adapt rules to local conditions, etc. Reward-eligible inventory may also be recorded/marked.

In the present example, it will be assumed that the example rewards program rules require that a consumer 108 complete at least one reward-eligible transaction at two or more resource providers 110 who are members of a group 130, and that the aggregate sum of reward-eligible amounts transacted by the consumer 108 at all resource provider 110s equals at least $120 within a 7-day period. In return for satisfying the rewards program rules, the rules provide that the consumer 108 will receive a reward equal to $10 in value for reward-eligible spending of at least $120, the reward issued as two $5 vouchers redeemable at an active reward provider 710.

At process block 512, following system 100 set up, the consumer 108 proceeds to the first resource provider 110 and purchases reward-eligible items totaling fifty-four dollars ($54 U.S.) (at FIGS. 1A/1B, arrow 136, and at 620 in FIG. 7) in a transaction with a total value of fifty-eight dollars ($58), $4 being ineligible for qualification purposes. In the present example embodiment, it is assumed this is a first transaction, wherein there is no prior qualifying transaction at any resource provider 110 in the group 130, wherein no UID120 or CID122 is associated with a prior transaction. In other cases, a transaction may be a subsequent transaction wherein a UID120 or a CID122 may have been used in a previous transaction in the rewards program and recorded in identifiers database 190 and transaction databases 188 and 192.

At process block 514, the consumer 108 pays for the transaction. The payment method may be of any type including a card (e.g., a credit/debit card, gift card, etc), a gift certificate, cash, a check, a traveler's check, a mobile device payment, and an online payment. In various embodiments, the payment method may be associated with CID122, such as an account number associated with a credit/debit card. At least a portion of the reward-related transaction data associated with the transaction is recorded in resource provider transactions database 188, so as to correlate the reward-related transaction data with at least one of a UID120 and a CID122. In various embodiments, a CID122 may be stored temporarily in static memory 206 and not in a database, and then expunged to avoid PCI DSS costs. In various embodiments, the resource provider 110 may record a UID120 only after receiving it from the reward handler 112 (at block 570 in FIG. 5B).

Further in reference to process block 514, before, during, or after completion of the transaction, the consumer 108 is prompted to present at least one of a UID120 and a CID122. The consumer 108 may present at least one of a UID120, a CID122, and no identifier to the resource provider 110 apparatus in one of several scenarios including the following. In various embodiments, the consumer 108 may present a UID120 which was obtained before a transaction. In various embodiments, the consumer 108 may present a payment-related CID122, e.g., a credit card associated with an account number. In various embodiments, the consumer 108 may provide a CID122 which is not payment-related, e.g., a phone number entered at a keypad. In various embodiments, the consumer 108 may designate which of several CID122s to use for rewards purposes, enabling a payment to be made by any method and a non-payment-related CID122 to be presented. In various embodiments, the consumer 108 may not have an identifier UID120 to present and may request a new UID120 to be issued, e.g., if consumer 108 does not wish to use a payment-related CID122. In the case of a subsequent transaction, in at least some cases, the consumer 108 may present one of a UID120 and a CID122 used in a previous transaction. For each said scenario, and other scenarios, system 100 uses or generates a UID120 by methods disclosed herein and associates the UID120 with the present transaction. In various embodiments, the UID120 is used only for internal processing purposes, wherein the consumer 108 may use the same CID122 in each of several transactions. In various embodiments, the consumer 108 may present an object 126 which contains at least one of a UID120 and a CID122. A said UID120 and a CID122 may be detected in the resource provider 110 apparatus, in a consumer 108 apparatus, or anywhere in system 100. In various embodiments, a CID122 may be detected at process block 522 after a payment authorization in lieu of detection at block 514. In any case, at least one of the same CID122, the same UID120, or a functional equivalent, is used for each transaction in common in a given rewards program, so as to enable association of disparate transactions in common. In various embodiments, additional data may be provided by consumer 108 including at least one of a residence zip code and other data, said consumer-provided additional data added to merchant-generated additional data at block 522 to generate an XID124 at block 524.

Further in reference to process block 514, in at least some cases, the at least a portion of reward-related transaction data may include an itemization of reward-eligible and reward-ineligible items, wherein a reward-eligible total required for reward processing (e.g., the $54 described above at block 512) may be distinguished from a transaction total required for payment processing (for example, the $58). In an advance, said itemization may include marking of reward-eligible items wherein said marking may enable the resource provider 110 selectively to promote sales of specific products, overstock, etc. and to collect funding for marketing costs from, for example, a third party associated with marked items.

At process block 516, in at least some cases, if the consumer 108 tenders a payment for the total transaction amount (e.g., the $58) by an electronic payment method, the payment process requires an authorization from a payment processor 102/106, wherein control then passes to block 580 in a known process illustrated in FIG. 1B. The process proceeds to FIG. 5A, blocks 580, 582, 584, 586, 588, 590, 592, 594, and 596. Referring again to block 516, if a payment authorization is required, then at block 580, the resource provider 110 may encrypt the transaction and other data using security measures including an encryption algorithm 1 typically provided by the resource provider 110's payment processor 102/106. At block 582, the resource provider 110 transmits the transaction data to the payment processor 102/106 as an authorization request. The transaction data for payment purposes at block 582 is distinguished from reward-eligible data compiled later at block 526, which may contain a different amount and other data. At block 584, the payment processor 102/106 decrypts the transaction data and at block 586 (in simplified form) processes the transaction data, wherein the processing may involve several entities and transactions database 182 (in FIG. 1B). At block 586 a determination is made if the payment is to be authorized or not. At block 588 the payment processor 102/106 generates a reply indicating an authorization or declination. At block 590 the payment processor 102/106 may encrypt and/or tokenize all or part of the reply and data, which the resource provider 110 receives at 592. If the authorization request is declined, the transaction in system 100 may terminate at block 596 or an alternative payment method may be requested, and if the authorization request is approved, control in process 500 passes to block 518. In various embodiments, system 100 reward processing and a reward may not occur without a transaction authorization or other message which may come from a payment processor 102/106 or a third party substantially as disclosed herein. Further at block 516, in the event authorization from a payment processor is not required in a transaction, as when cash is tendered, control passes to process block 518.

At process block 518, if a CID122 such as a graphic or a biometric reading is not already presented in a digital format, the CID122 is rendered into a useful digitally formatted string by a string generation processor typically associated with the resource provider 110 apparatus by a computer implemented process which may include a pattern recognition process, an optical character recognition process, an algorithm, and other methods.

At process block 520, the identification type of the CID122 may be recognized, serving as additional data at block 524. In various embodiments, said recognition occurs by automated methods wherein the type of CID122 is recognized as a credit card, a phone number, a biometric entry, etc. In various embodiments, a manual or other data entry may specify the identification type, wherein at a POS keypad a consumer 108 may indicate a payment type. In various embodiments, a specific device such as a signature keypad or a camera may indicate the identification type.

At process block 522, in at least some cases, one or more of the resource provider 110 and the string generation processor may generate additional data which may be useful for generating a unique XID124 at block 524. In various embodiments, said additional data may be obtained from at least one of a payment processor, a transmission, a device, and a data entry, or may be generated automatically by software methods at the resource provider 110 apparatus. In various embodiments, said additional data may include a portion of the consumer 108's data, e.g., initials, a PIN including a system 100-associated PIN, a region, etc. In various embodiments, said additional data may be generated by computer implemented methods by selecting or generating digits, values, or data from a CID122 string to create an intrinsically unique string, self-generated without reference to other inputted data and unlike any existing issued string, for example, by combining the last four digits of a credit card number with the first two characters each of the cardholder's first and last name, or by transposing digits in a certain position in a card number, or by including a checksum value, or by salting the data, or by any other algorithm or method useful to generate a unique string at block 524. In various embodiments, to deter fraud, the string generation processor may exclude or mask sensitive data, for example, a whole account number; a card security code (CSC), a PIN number; and the like, wherein said sensitive data is excluded in generating an XID124 at block 524 and the reward handler 112 does not receive said sensitive data at block 532.

At process block 524, in at least some cases, in the absence of a presented UID120, the string generation processor generates an XID124 from data, including a CID122, obtained or generated at one or more of blocks 514, 518, 520, and 522, typically by a computer implemented process including an algorithm. Generation of an XID124 is intended to produce a unique string which differs from a CID122. Contributing data elements to an XID124 may be stored separately by the reward handler 112 for other purposes. In various embodiments, the method of generation of an XID124 string may enable its subsequent determination as a unique form of identification by heuristic or probabilistic methods, wherein the string is exceedingly unlikely to be duplicated in a given rewards program.

Figure 7:
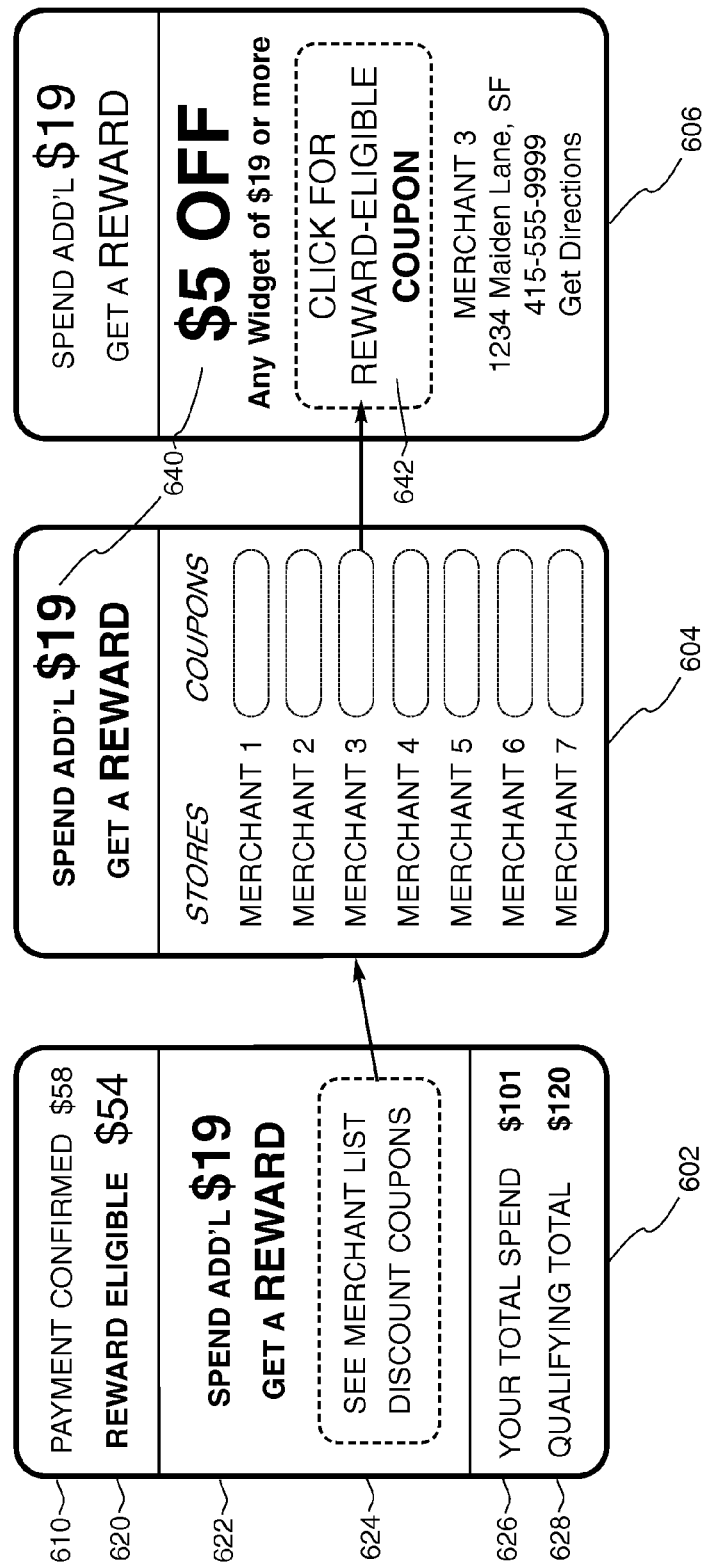
FIG. 7 illustrates one embodiment of a mobile device display in an electronic rewards generation system.

At process block 526, the resource provider 110 compiles reward-related data including data from one or more of blocks 514, 518, 520, 522, and 524, including a UID120 or an XID124. Said reward-related transaction data including a reward-eligible amount, and its routing and processing, are distinguished from transaction data which may be transmitted to and processed by a payment processor 102/106 and associated with a payment card or consumer account. In various embodiments, the amount designated as reward-eligible excluding reward-ineligible charges differs from the amount which may be submitted to the payment processor for payment authorization. For example, FIG. 7 illustrates a reward-eligible total at 620 ($54) as distinct from a transaction total at 610 ($58). No known payment processor 102/106 is configured to distinguish reward-eligible transactions as determined by a resource provider 110 from a transaction total which is submitted for payment authorization. In a preferred embodiment, at least a portion of the reward-related transaction data may be acquired and compiled at block 526 in real-time while a transaction is in progress, e.g., at the POS, and may be recorded in the transactions database 188, wherein it is immediately ready to assess for reward qualification during the course of a transaction.

At process block 528, in a typical embodiment, all or part of the reward-related transaction data compiled at block 526, including a generated XID124 but excluding a CID122, is encrypted at the resource provider 110 apparatus using an encryption algorithm 2, generating ciphertext. Algorithm 2 may be provided by the reward handler 112 and typically will differ from the encryption algorithm 1 at block 580. Encryption by the algorithm 2 may be applied to a different data set than is applied in encryption by the algorithm 1 at block 580 of total transaction data submitted to a payment processor. In various embodiments, a transaction total including ineligible items need not be transmitted at all to the reward handler 112. In a typical embodiment, said encrypting of data at block 528 is intended to comply with PCI DSS and other data security requirements. In various embodiments, public key encryption may be a suitable method for a multi-merchant rewards program, wherein each resource provider 110 in a rewards program may use the same public encryption key.

At process block 530, the encrypted data from block 528 is transmitted to the reward handler 112 apparatus by a computer implemented process. In various embodiments, in the event a payment processor is involved in a transaction, the resource provider 110 may have a separate relationship with, may route and transmit different data to, and may receive different data from each of the reward handler 112 and the payment processor. In various embodiments, no reward-related data, even if compiled, is transmitted to the reward handler 112 absent a payment authorization or other required message from a payment processor or a third party. In various embodiments, the rewards program process 500 provides for simultaneous payment processing and reward processing, wherein the reward qualification process may proceed, contingent upon a payment authorization, wherein the two processes may operate on parallel tracks to speed processing and reduce waiting time for the consumer 108 at the POS.

In the present example process, steps disclosed in FIG. 5B including blocks 532 through 578, inclusive, continue in sequence for the first transaction at the resource provider 110. Before proceeding with describing process 500, we will assume here two subsequent transactions by the consumer 108 following a reward-eligible purchase of $54 at the first resource provider 110. The consumer 108 continues to a second and a third resource provider 110 using the same UID120 or CID122, purchasing reward-eligible items with a value of thirty one dollars ($31.00 US) and forty dollars ($40.00 US) respectively in subsequent transactions within the time period specified in the program rules. The sum of purchases at the three resource providers 110 is one hundred twenty five dollars ($125.00 US), excluding reward-ineligible items in the transaction totals, exceeding the rules requirement of spending $120 within seven days to qualify for a reward. Reward-related transaction data for each purchase is recorded and stored in each respective resource provider 110 transactions database 188. Each transaction then proceeds with steps illustrated in FIG. 5B, providing different contingencies for transaction identification.

At process block 532, the reward-related transaction data, encrypted at block 528 and transmitted at block 530 is received and decrypted at the reward handler 112 apparatus by a computer implemented process. Only the reward handler 112 is in possession of the necessary key to decrypt ciphertext encrypted by algorithm 2. In various embodiments, the key may comprise a private key which decrypts data encrypted with a public key. In a typical embodiment, reward handler 112 does not possess a key to decrypt transaction data encrypted for payment purposes with algorithm 1, so data in system 100 remains secure and visible only to the respective parties entitled to certain specific data.

At process block 534, a determination is made by the reward handler 112, based on the decrypted data, whether the consumer 108 has previously presented a UID120. If so, the UID120 is included in the reward-related transaction data received at block 532. If a UID120 is included in the decrypted data, control passes to block 550. If a UID120 is not included, control passes to block 536.

At process block 536, if consumer 108 has not presented a UID120 at block 534, then a determination is made whether 108 has presented a previously used CID122, as determined by whether a corresponding XID124 in the decrypted data, if any, matches a previously recorded XID124 or a corresponding UID120 in a database such as identifiers database 190, wherein, if so, control passes to block 538, and if not, control passes to block 540.

Referring again to block 536, if consumer 108 has previously presented a CID122, then at process block 538, the UID120 associated with the corresponding XID124 is retrieved from a database stored in a vault which may include identifiers database 190, transactions database 192, and rewards program database 194, and control passes to block 550, wherein the retrieved UID120 is used.

At block 540, if consumer 108 has presented a CID122 for the first time in the rewards program in the current transaction, then at process block 542 a UID120 is generated by a transaction associating identifier generation processor by a computer implemented process which may include one or more of an algorithm, conversion, salting, encryption, and tokenization, wherein the generated UID120 is associated with the XID124 generated at block 524 from data including said CID122 and transmitted at block 530. In various embodiments, a random number generator may create a token as a UID120 associated with said XID124. In various embodiments, a second set of additional data (e.g., salting) is added to an XID124 in order to generate a secure unique UID120. Further at block 542, said generated UID120 and associated XID124 are recorded in one or more of the reward handler 112's databases including identifiers database 190, wherein control passes both to block 546 (for storage) and to block 550 (for further reward processing).

Referring again to blocks 538 and 542, for any CID122 received at block 514 and compiled at block 526, the string generation processor generates a functionally equivalent XID124 at block 524 and the transaction associating identifier generation processor generates a functionally equivalent UID120 at block 542, each generated UID120 stored at block 546 and retrievable at block 538, wherein repeated use of a CID122 in transactions at different resource providers 110 consistently generates or locates a functionally equivalent UID120, wherein the consumer 108 may use any one of a plurality of a CID122 to qualify for a reward, provided the CID122 is common to each transaction in a rewards program, the CID122 including for example one of the same credit card, account number, mobile device, identification, and phone number.

Referring again to block 540, if the consumer 108 has not presented a CID122 in the present rewards program and requests or requires a new UID120, then at process block 544 a new UID120 is generated by a computer implemented process by the transaction associating identifier generation processor. Further at block 544, the generated UID120 is recorded in one or more of reward handler 112's databases including identifiers database 190, wherein control passes both to block 546 (for storage) and to block 550 (for further reward processing).

Referring again to blocks 542 and 544, each UID120 generated in system 100 comprises a proprietary string unique to system 100, the string useful only in system 100 and having no other use. In the case of generating a UID120 from an XID124 at block 542, each UID120 is generated so as to differ from, be untraceable to, and be unable to retrieve or recreate its original CID122 source, rendering the UID120 safe, secure, and useless for fraud purposes.

At process block 546, the new UID120, generated at block 542 or block 544, is recorded and stored in a secure vault which may include identifiers database 190 and other databases wherein in a typical embodiment all UID120s and XID124s are stored and protected in accordance with PCI DSS requirements. In a typical embodiment, the reward handler 112 controls a method to locate each UID120, wherein an index may provide mapping methods to associate each generated UID120, its XID124, and correlated data.

In various embodiments, along with recording a UID120, the reward handler 112 may record multiple data items including one or more of reward-related transaction data acquired or generated at one or more of blocks 514, 518, 520, 522, 524, and 526. In various embodiments, a log of events, including UID120 generation failures and non-authorized transactions, is recorded in a system database.

Referring again to blocks 534, 538, 542, 544, and 546, for any system 100 transaction a UID120 may be presented or generated or retrieved, wherein control passes to block 550.

At process block 550, the reward handler 112 associates the current transaction with the said presented or generated or retrieved UID120, wherein said association is recorded in transactions database 192.

At process block 552, said reward handler 112 identifies all transactions associated with the UID120 by locating each instance of the UID120 in transaction records corresponding to at least one of the present rewards program and a plurality of rewards programs.

At process block 554, a rule implementer associated with the reward handler 112 executes a computer implemented process to determine whether the consumer 108 has exhibited the desired behavior satisfying the rewards program rules by comparing the identified transactions to the rules requirements. In various embodiments, the rule implementer assesses whether the consumer 108 has satisfied the program rules by one of achieving at least a spending threshold as determined by summing or assessing the consumer 108's reward-related transaction amounts linked to the rewards program, and engaging in one or more rule-required behaviors.

At process block 556, if the rules requirements are not satisfied, control passes to block 560, and if rules requirements are satisfied, control passes to block 570.

At process blocks 560 and 562, in at least some cases including when rules requirements are not satisfied, the reward handler 112 may transmit one or more of a message, a notice, and a communication (herein called a message) via a communications system indicating unmet rules requirements and related information. Said one or more messages comprise an element of system 100 to induce behavior modification, generate revenue, and promote traffic, spending, and desired results. A said message may consist of one or more of a plurality of communications including an exchange to and from any of one or more apparatuses associated with the reward handler 112, the resource provider 110, the consumer 108, a website, a storage facility (the message saved for future use), and a third party including a consumer 108 friend or associate, a family member, and other consumers 108. It is supposed that the reward handler 112 will maintain a database of consumer contact information (e.g., e-mail addresses, phone numbers, social network addresses, etc.) for messaging purposes. In various embodiments, a message may initiate one or more actions including displaying a message on a screen and printing a message on a receipt or a sheet. In various embodiments, a message may be conveyed orally to a consumer 108.

At process block 560, if rules requirements are not satisfied at block 556, a message may be transmitted as provided above, including one or more of an indication of non-qualification for a reward and in at least some cases the status of qualification and other information. Further, at block 560, a message may include a UID120 generated at block 542 or block 544 for future use by the consumer 108, enabling additional qualifying transactions using any payment method.

At process block 562, in the case of the rules requirements being unmet, in at least some cases a message may be transmitted including information about methods to satisfy rules requirements to qualify. The message may include one or more of (i) an indication of the remaining spending amount or other required behavior; (ii) a list of resource providers 110 in a group 130 at which qualification may be achieved, including location, etc.; (iii) a list of offers, coupons, advertising, incentives, and other messages to enable or entice the consumer 108 to qualify; (iv) a choice of actions for the consumer 108; (v) an added opportunity for rewards, incentives, etc.; and (vi) other messages. Further at block 562, the message may be associated or combined with one or more messages from any entity including at least one of a plurality of resource providers 110, groups 130, advertisers, sponsors, marketers, shopping centers, and third parties.

Further in reference to block 562, in an advance, a said message, for example a discount coupon, may be associated with, responsive to, or contingent upon at least one of a reward qualification determination, a calculation, a reward-eligible transaction amount, and the like, wherein the message is adaptive to a system 100 element including data associated with a UID120. For example, the discount or product or service provided in the coupon may be adjusted by the reward handler 112 by computer implemented methods to take into account the remaining amount required to satisfy rules requirements (as illustrated in FIG. 7 at 602, 604, and 606 and described further below). Said adjustment may enhance the usefulness and value of the coupon (herein an "adaptive coupon" and an "adaptive message") wherein (i) the amount of the adaptive coupon discount is associated with the remaining requirement needed for the consumer 108's reward qualification; (ii) the system 100 provides two layers of incentive at once, that is, the adaptive coupon discount and the reward; (iii) the adaptive coupon advertiser reduces its coupon redemption cost by adjusting the discount to the minimal amount required to satisfy program rules; (iv) the consumer 108 is more likely to use the adaptive coupon because it qualifies for a reward, rendering an adaptive coupon more valuable and effective than a conventional coupon; and (v) the adaptive coupon targets a highly motivated consumer 108 who is actively spending nearby and may want a reward, such a consumer being an especially valuable target for an advertiser. Any method of adapting a message to a system 100 element may be used. It is anticipated that in nearly every instance of reward qualification one or more transactions occurs before a consumer 108 satisfies rules requirements, typically in a subsequent transaction, wherein an adaptive message may be modified accordingly in each separate transaction, serving a useful function to induce spending and traffic and to provide marketing functions. A similar adaptive message may be transmitted at block 570 (below) to any consumer 108 that satisfies rules requirements, wherein the adaptive message may induce one or more of increased spending for a greater reward, redemption of vouchers at a particular reward provider, and other behaviors. An adaptive message is regarded as reward-related transaction data.

In yet another example at block 562, in a further advance, an example advertisement or coupon as an adaptive message may be responsive to one or more of a plurality of actively spending consumers 108, the consumer 108 determined by the rule implementer to be not-yet-qualified but eligible for a reward, the determination enabled by locating UID120s in a system 100 database, each consumer 108 having patronized disparate merchants 110 in a given resource provider group 130 category such as furniture, the group 130 category itself and its merchant 110 composition made possible by system 100's fewer restrictions, for example in the absence of a payment processor's requirements that restrict merchant enrollment, wherein system 100 can form distinctively differentiated and organized groups 130 for marketing purposes, each group 130 configured for electronic reward processing independently of payment processing. In an advance, at block 562 (or at block 570) the reward handler 112 may transmit one or more adaptive messages including advertisements and coupons targeted to the plurality of active consumers 108 who have patronized disparate furniture-associated merchants 110 within a region, wherein (i) the determination which identifies active spenders 108, (ii) the differentiated categorization and merchant 110 composition of system 100's groups 130, and (iii) the adaptive message customizable to each consumer 108's qualification status, may create an unprecedented targeted advertising medium. No known advertising, marketing, or reward system can identify and target consumers (by their recorded behavior), and transmit timely adaptive messages to a plurality of consumers, for example, actively shopping in a region in a specific shopping category comprised of a set of associated but disparate resource providers, wherein the consumers are determined by the methods disclosed herein of a universal transaction associating identifier (UID120). Notably, the consumers 108 need not qualify for a reward to be identified in system 100 to receive an adaptive message, wherein the population of targetable consumers 108 may be far larger than the population of reward qualifiers. In this way in a function advancing beyond rewards, the disclosed UID120s and system 100 serve as unique methods to reach selected consumers 108 engaging in desired behaviors on a large scale in real-time or within a time frame, the methods resulting from UID120 generation, transaction identification, and novel elements, combinations, and advances disclosed herein.

Referring again to block 562, after messaging, control then moves to block 578, described below.

Referring again to block 556 in FIG. 5B, if the rules requirements have been satisfied, control passes to block 570, wherein by the same method set forth above in blocks 560 and 562 at least one message is transmitted from the reward handler 112 to one or more of the resource provider 110 and the consumer 108 indicating satisfaction of the rules requirements and other information including a UID120 and one or more adaptive messages as described above.

At process block 572 the reward handler 112 identifies or quantifies at least one of a reward and a number of vouchers exchangeable for a reward and transmits a message accordingly. In the present example, if the three transactions associated with the consumer 108 collectively satisfy the program rules by totaling at least $120 reward-eligible in seven days, the consumer 108 is eligible to receive as a reward two (2) vouchers with a value of five dollars ($5) each, totaling $10 in reward value. In various embodiments, the message at block 572 may provide additional reward redemption information to the consumer 108 including a list of reward providers 710 and their respective rewards, locations, redemption terms, and other information, coupled with further adaptive messages described above (e.g., a coupon or inducement).

Referring again to block 572, in at least some cases it is contemplated that system 100 may include rewards arising from administration of a reward provider market (a competitive bidding method and system) inclusive. System 100 may thereby provide improved rewards that differ in kind from limited rewards commonly offered by a payment processor 102/106 such as cash back, rebates, miles, points, etc., wherein the latter type of rewards are typically awarded by crediting an account after a delay to receive funding. Studies indicate that rewards of the kind credited by a payment processor (especially when delayed) tend to be less effective as behavioral motivators than tangible goods, services, meals, food, events, etc. which provide direct and timely personal, physical, and emotional experiences and treasured trophies, as are provided in system 100 by voucher exchange with reward providers 710. In an advance, system 100 may provide improved rewards at economical cost by administering a said competitive bidding method and system, wherein the opportunity to offer improved rewards, including by bidding, serves as an unprecedented marketing method for reward providers 710 and a method to promote commerce in a community. By this bidding method, voucher redemption traffic including highly desirable qualifying spenders may be driven to reward providers 710 in a novel way.

At process block 574, the at least one message transmitted at block 572 identifying a reward may provide at least one of a choice for the consumer 108 to receive the reward or its voucher equivalent, and to continue shopping to increase the reward. The consumer 108 may choose to accept the reward, continue shopping, select a coupon or offer, request status or information, and engage other system services. If the consumer 108 accepts the reward, control passes from block 574 to block 576, and if the consumer 108 does not accept a reward, control passes to block 578.

Referring again to block 574, if the consumer 108 accepts the reward, at process block 576 the reward is presented to the consumer 108. In various embodiments, the resource provider 110 apparatus, including the consumer interface 186 and the printer 180, may convey the reward including one or more vouchers 140. If vouchers 140 are issued, each voucher 140 is tracked by recording its voucher identifier 142 in the rewards program database 194, the record including one or more of data such as the value of the reward, issuance date, the associated UID120, an expiration date, anti-fraud measures, and other data. Said voucher identifier 142 and associated data may be useful for voucher authentication upon redemption, prevention of voucher re-use following redemption, allocation of funding shares among resource providers 110 and others, analytics, security, and other purposes. Further at block 576, one or more of the plurality of awarded vouchers 140 may be redeemed at one of a plurality of reward providers 710, said redemption being more fully described below in FIG. 8. Upon issuance of the reward, all corresponding transactions tied to the UID120 may be invalidated in the rewards program database 194, wherein typically the same transactions may not be used again for qualification.

Referring again to block 574, if the consumer 108 does not accept a reward, or at block 556 if program rules are unmet, at process block 578 UID120-associated qualifying transactions are not invalidated and remain valid for reward qualification purposes in a subsequent transaction. In various embodiments, a consumer 108 may access on a system 100 website information including status, reward-related transaction data, the remaining requirement, active reward providers, available rewards, etc. associated with the UID120 and vouchers 140.

Examples of Initial Sources of Identification to Generate a UID120

Figure 6A:
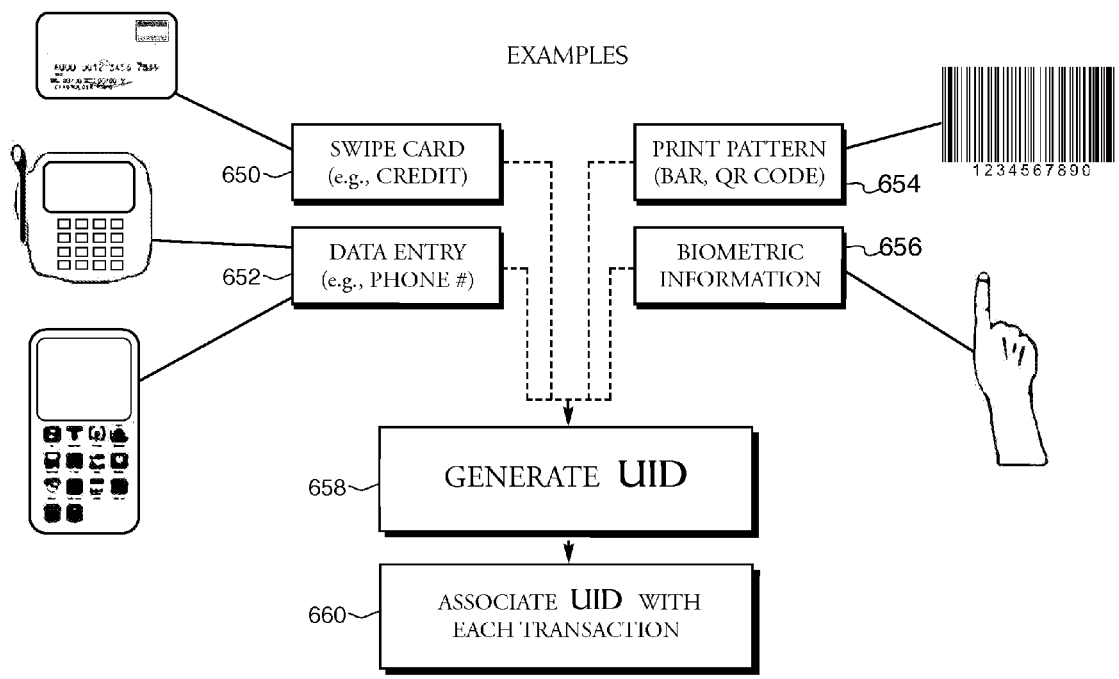
FIG. 6A illustrates examples of initial sources of identification to generate a universal transaction associating identifier.

FIG. 6A is an illustration of examples of initial sources of identification, consumer identifiers, or tokens (CID122)

which may be presented by a consumer for generating a UID120. Examples include a swipe card at block 650, data entry in a POS device or smartphone at block 652, a print pattern such as a bar code or QR code at block 654, and biometric information at block 656. Other types of identifiers may be presented as well. At block 658, a UID120 is generated as described herein. At block 660, the UID120 is associated with the corresponding transaction.

Examples of Objects which May Contain a UID120

Figure 6B:
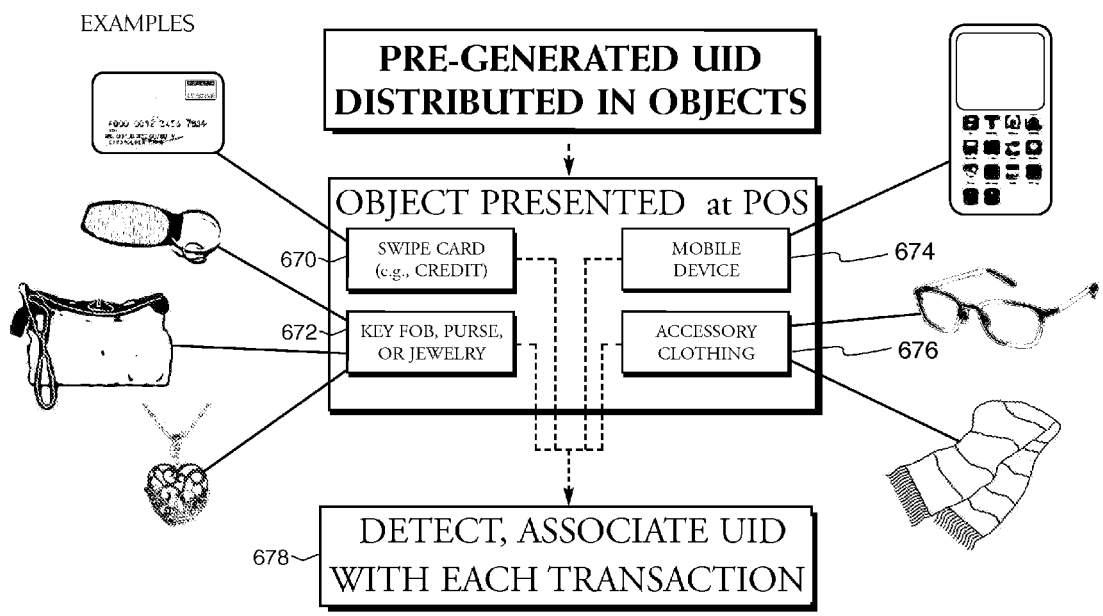
FIG. 6B illustrates examples of objects that may contain a universal transaction associating identifier.

FIG. 6B illustrates examples of objects or tokens which contain a pre-generated UID120, typically in a non-transitory machine-readable medium including a non-volatile memory associated with the object. A consumer may present any suitably configured object. Examples include a swipe card at block 670, a key fob, purse, or jewelry at block 672, a mobile device or smartphone at block 674, and an accessory or article of clothing at block 676. Other types of objects may be employed as well. At block 678, the UID120 contained in or associated with any suitably configured object is detected and associated with the corresponding transaction.

Example Screen Display

FIG. 7 is an illustration of a consumer 108 apparatus depicting three sequential example screen displays 602, 604, and 606 wherein a consumer 108 may use a computing device to enact a transaction and receive one or more messages, the apparatus (device) type including an NFC-enabled contactless mobile device, a tablet, a cell phone, a touchscreen, a computer, and other apparatuses. FIG. 7 illustrates a mobile device display screen. A similar set of screens may be displayed at one or more of a resource provider 110 apparatus, a website, a kiosk, and any other suitable apparatus or device.

In various embodiments, the screen and data at blocks 602, 604, and 606 are not displayed until at least one of a payment authorization or other required message is received, as described above.

Example screen display 602 illustrates a transaction total at 610; a reward-eligible transaction total at 620; a remaining unmet requirement at 622; a method to access resource providers 110 in a rewards program and their corresponding adaptive coupons at 624; a total of accumulated qualifying spending in the rewards program at 626; and a spending threshold (as a rules requirement) at 628. In a typical embodiment, the information shown in 602, 604, 606 and similar displays is disclosed in one or more messages transmitted from the reward handler 112 at process block 510 in FIG. 5A and blocks 560, 562, 570, 572, and 576 in FIG. 5B. Data for said messages is compiled in part, calculated, or assessed by the methods disclosed above at process blocks 514 and 526 in FIG. 5A and blocks 532 to 556 inclusive in FIG. 5B to determine reward-eligible amounts, satisfaction of rules requirements, and related data.

At 610 in block 602, the example transaction total is $58, indicating the total purchase amount including reward-eligible and reward-ineligible items, which amount may be submitted if required in a payment/credit authorization request to a payment processor as described above in reference to blocks 580 to 596 inclusive in FIG. 5A. At 610, said amount and notice of authorization are illustrated as "Payment confirmed $58," however alternative terms may be used in this and all screen display terms, respectively.

At 620 in block 602 the example reward-eligible transaction total is $54, wherein the consumer 108 is informed of the total of reward-eligible items in the present transaction, excluding reward-ineligible items such as sales tax and excluded items.

At 622 in block 602 the consumer 108 is informed of the remaining amount required to satisfy the rules requirement in the present rewards program, which is $19 in this example.

At 624 in block 602 the consumer 108 is provided methods such as a screen icon to press or click to satisfy unmet rules requirements, including accessing information about the resource providers 110 in the rewards program and adaptive coupons they may offer.

At 626 in block 602 the qualification status of the consumer 108 is displayed including the total spending associated with a UID120 for transactions in common in the rewards program including the current transaction, the total spending equaling $101 in this example.

At 628 in block 602 the consumer 108 is informed of a spending threshold as a rules requirement, illustrated as $120. In this example, the amount at 622 ($19) is the amount at 626 ($101) deducted from the amount at 628 ($120).

Referring again to block 602, when the consumer 108 selects (or clicks an icon of) the option at 624, a second screen appears by a computer implemented method, shown at block 604, displaying a method to satisfy unmet rules requirements including in this example a list of resource providers 110 (Merchants 1-7) in the same rewards program, and an option to select adaptive coupons offered by or information about each participating resource provider 110.

At block 604, the consumer 108 may select or click an adaptive coupon or request information associated with a resource provider 110, wherein a third screen appears at 606 displaying the corresponding adaptive coupon, discount, offer, advertisement, information, or other message, which may include access to further information such as directions and hours.

At block 606, the consumer 108 may be provided a reward-eligible adaptive message including an adaptive coupon wherein at 640 the amount, discount, or offer may be associated for example with the remaining amount required to satisfy the rules requirement as illustrated at 622 in block 602 or with one or more system 100 elements. Merchants 1-7 indicated in block 604 may each offer an adaptive coupon, each adaptive coupon determined separately by each merchant, the several merchants competing with each other for additional spending by consumer 108 which may be required to satisfy the remaining requirement. The consumer 108 has a choice of any of Merchants 1-7 and their adaptive coupons to qualify for a reward. In this example, the adaptive coupon at block 606 provides a $5 discount off any widget having a price of $19 or more, wherein the $19 price equals the remaining requirement for the consumer to qualify for a reward. Use of this example adaptive coupon will result in a both a $5 discount for purchasing a $19 widget and a reward equal to two (2) $5 vouchers or $10 for spending at least $120 in the rewards program. Additional information about an adaptive coupon-associated product, service, etc. may be provided. At block 606, the consumer 108 may select or click his/her preferred coupon icon choice at 642, wherein the reward-eligible adaptive coupon is issued by electronic, printed, or other methods. Use of the issued adaptive coupon may be tracked and associated with reward-related transaction data associated with the corresponding UID120, wherein the data may be used for any purpose. By the method described herein, a UID120 serves an added purpose in system 100 including adaptive message management/tracking wherein adaptive messages are associated with reward-related transactions, each message correlated with a UID120. Issuance or use of an adaptive coupon may generate system 100 revenue apart from reward or voucher revenue.

The example screen displays and data shown in FIG. 7 are example only and may be displayed in other ways, including the same or more or less data, more or fewer screens, and in other ways, to accomplish the intended functions of system 100.

Example Reward Redemption System

FIG. 8 is a diagram depicting an example reward redemption system 700 (a network) that includes, among other entities, at least one reward provider 710(s), at least one reward handler 112, and at least one consumer 108 (or voucher redeemer 108). In addition, system 700 may include at least one rewards database 788(x) associated with a reward provider 710, at least one rewards/reward providers database 796(t) associated with a reward handler 112, at least one rewards program database 194 also associated with the reward handler 112, at least one voucher 140(m), each voucher 140 associated with a voucher identifier 142, as well as at least one consumer interface 786. Said at least one voucher 140 may be associated with at least one object 126 (not shown). Said redemption system 700 is regarded as part of system 100.

A reward provider 710 is an entity which may provide one or more of any type of a reward directly or in exchange for one or more vouchers 140 in a reward redemption process associated with systems 700 and 100. A reward provider 710 may include at least one of a resource provider 110, a shopping center 710, a website operator 710, a system 100 host administrator 710, and any other business 710 or entity 710, and may be located anywhere. A reward provider 710 serves a different role in system 100 than a resource provider 110. In various embodiments, a reward provider 710 may also play the role of a resource provider 110 in a given rewards program, serving both roles. In various embodiments, a reward provider 710 is contracted to offer one or more rewards for a specified period.

A reward provider 710 apparatus may be configured in the same manner as a resource provider 110 apparatus described above, including methods to detect a voucher identifier 142. A 710 apparatus and a resource provider 110 apparatus may comprise the same or different equipment and may include hardware/software which provide transaction, communication, qualification, and redemption functions. In various embodiments, a reward provider 710 apparatus, including a resource provider 110 apparatus and a consumer 108 apparatus, may be used to detect one or more voucher 140 identifiers 142 upon redemption.

A consumer interface 786 is a display for messages which may be associated with a reward provider 710 apparatus, such as a POS system display screen or a consumer 108 apparatus including a mobile device screen.

A universal voucher 140 is at least one of a reward, an incentive, and a device or mechanism by which a reward or incentive may be awarded, issued, exchanged, or disseminated by at least one of a resource provider 110, a group 130, and a third party. A voucher 140 is universal in the sense that one or more vouchers 140 received from any of a plurality of issuers may be aggregated, redeemed, and exchanged for any available reward offered by one or more of a plurality of active reward providers 710 as may be arranged by a rewards program implementer. An apparatus, method, and system for generating a voucher for a reward in a rewards system are disclosed in U.S. patent application Ser. No. 12/942,693. A voucher 140 may be at least one of an electronic (virtual) voucher 140 and a physical voucher 140, as disclosed in U.S. patent application Ser. No. 12/942,693. Each voucher 140 is associated with a unique voucher identifier 142, wherein each voucher identifier 142 is recorded in at least one database such as rewards program database 194. A voucher 140 may contain features for validation purposes and to deter fraud. In various embodiments, one or more vouchers 140 may be disseminated in various modes including (i) by the reward qualification methods disclosed herein, (ii) by a sponsor, (iii) by any entity in a promotion including incentives; (iv) by an issuer to a consumer 108 satisfying program rules; (v) by completion of a survey, and (vi) in modes disclosed in U.S. patent application Ser. No. 12/942,693. Voucher 140 redemption is subject to rewards program rules and voucher redemption terms and conditions including a voucher expiration date.

A reward database 788 is a database mechanism for a reward provider 710 to record and track in a reward provider 710 apparatus at least one of rewards, redemptions, voucher identifiers 142, and other data.

A rewards/reward providers database 796 is a database mechanism for a reward handler 112 to record and track at least one of rewards, reward providers, and other data.

A rewards program database 194 is a database mechanism for a reward handler 112 to record and track at least one of rewards, reward providers, redemptions, voucher identifiers, reward values, reward fees payable to reward providers, redemption terms, and other data, in addition to data recorded for other purposes disclosed above.

Further in reference to FIG. 8, an example redemption occurring within the redemption system 700 begins when a consumer 108 wishes to redeem and presents one or more vouchers 140 to a reward provider 710 (arrow 736). In a typical redemption, reward provider 710 then detects the voucher identifier 142 corresponding to each presented voucher 140 and authenticates said one or more vouchers 140 by communicating with the reward handler 112 (arrow 740), wherein the reward handler 112 compares the voucher identifier 142 to records in rewards program database 194 to determine the status of each voucher 140 including whether it is valid and invalid (e.g., previously redeemed, expired, fraudulent, etc), wherein the redemption process may include associating each voucher 140 with a UID120, disqualifying it for future use, fraud detection, recording and updating redemption records, and other steps.

In various embodiments, for each invalid voucher 140, the reward handler 112 communicates with the reward provider 710 at arrow 742, wherein the reward provider 710 notifies the consumer 108 of the invalid voucher 140 at arrow 738, including at consumer interface 786. The reward provider 710 may decline to issue a reward for each invalid voucher 140. A record of the invalid voucher 140 and a possibly fraudulent redemption is retained by the reward handler 112 in the rewards program database 194, and, in at least some cases the invalid voucher 140 is confiscated or destroyed. In various embodiments, a message may be transmitted from the reward handler 112 to the consumer 108 indicating the voucher 140 is invalid.

In various embodiments, for each valid voucher 140, the reward handler 112 notifies the reward provider 710 at arrow 742 that the voucher 140 is valid, wherein the reward provider 710 may provide the reward to the consumer 108 at arrow 738 in accordance with the description above of exchanging vouchers 140 for a reward. A record of the redemption is retained by the reward handler 112 in the rewards program database 194, and by the resource provider 710 in the rewards database 788, including the voucher identifiers 142 and the UID120. In a typical embodiment a reward provider 710 may receive reward fee for each valid redeemed voucher.

In various embodiments, prior to a redemption, a schedule of rewards and active reward providers 710 in a given time period is publicized including by one or more of a message to a consumer 108 device (including at block 576 in FIG. 5B), at a program host website, by e-mail, at merchants' stores, and by other methods. In various embodiments, multiple vouchers 140 may be aggregated and redeemed at a single reward provider 710, wherein a consumer 108 may obtain a more desirable or valuable reward than may otherwise be attainable, and wherein a said reward increases consumer 108's incentive to patronize multiple disparate system 100 participants. In various embodiments, a reward is assigned a value by a reward provider 710 wherein vouchers 140 totaling said value are required to exchange for the reward. In various embodiments, a reward provider 710 may accept one or more vouchers, or an equivalent, or any substitute, or nothing, in exchange for a reward, and may further package a reward with an offer, etc. wherein the reward provider 710 is motivated to attract traffic and new and repeat customers for marketing purposes and may do so by any suitable method. In various embodiments, a reward, a good, a service, etc. is offered having a higher value than the redemption value of vouchers 140, wherein a consumer 108 may pay an amount equal to the difference between the value of the reward and the value of the redeemed vouchers 140, or another amount. In various embodiments, a voucher 140 may represent points, miles, "dollars," cash back, credits, or any other value which may be honored by a reward provider 710. In various embodiments, a voucher 140 may be used as an entry in a sweepstakes. In various embodiments, a voucher 140 may be redeemed only at one or more specified reward providers 710. In various embodiments, alternative methods of awarding a reward are available without use of vouchers 140, including conveyance of goods and services, issuance of credits, discounts, tickets, etc. In various embodiments, other methods of reward redemption and reward exchange for vouchers 140 are provided within the scope of system 100.

During or after the life of a rewards program, the reward handler 112 may use one or more system 100 databases to track and analyze the behavior of consumers 108, including by their use of UID120s, CID122s, vouchers 140, and adaptive messages. The reward handler 112 may track and analyze all transactions conducted at the resource providers 110 and groups 130, redemptions conducted at the reward providers 710, and usage of adaptive messages including adaptive coupons, associated with one or more rewards programs to assess whether the program was cost-effective. The analysis may include determining if the behaviors exhibited by the consumers 108 met program objectives such as driving traffic and spending.

Funding and Reward Costs

In at least some embodiments, to pay for a program reward, funds request messages are sent by a reward handler 112 to the respective reward providers 110 as payors identified in FIG. 4D at block 484 for each example reward itemized at block 480. An additional funds request message may be generated by the reward handler 112 and settled from an internal account for any portion payable by the reward handler 112, or may be sent to a sponsor or other third party payor. In various embodiments, the payors pay their respective shares according to an agreed formula. For example, each resource provider 110 may pay that share (a "voucher fee") of system 100 costs associated with a reward in that proportion to which its own one or more transactions bears to the reward-eligible total. If the reward-eligible total is $120 and the resource provider 110's share is $36, representing 30% of the total, and the voucher fee is $10 for the associated reward, then that resource provider 110 may pay 30% of $10, or $3 (corresponding to its $36 reward-eligible transaction). An itemized summary of system 100 costs per transaction and per resource provider 110 may be generated by the reward handler 112 from data in the rewards program database 194 and billed conventionally. In an improvement over methods wherein a payment processor must first receive the funds before awarding a reward, awarding a reward in system 100 may occur immediately at the POS and is not contingent upon prior receipt of payment by one or more payors.

In various embodiments, it is contemplated that for each redeemed voucher 140 the redeeming reward provider 710 is paid a fee (a "reward fee") wherein a portion of the voucher fee revenue may be allocated to pay reward fees, thereby attracting reward providers 710 and sustaining reward variety and quality over time. In an advance, in at least some cases the reward handler 112 may operate a reward provider market including a competitive bidding method described above wherein rewards, reward fees, redemption terms, etc. may be determined, wherein a reward provider may be paid a reward fee for each voucher 140 it redeems in an amount equal to its accepted bid. As a result of said bidding method, the reward cost to the rewards program host administrator may be a fraction of reward value, or zero, or a negative amount for a reward.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. One or more process or method steps may be omitted or one or more process or method steps may be added. Structures and functionality presented as separate components in example configurations may be implemented as a combined structure or component. Similarly, structures and functionality presented as a single component may be implemented as separate components. One or more processes or method steps may include a novel combination of separate components or operations, one or more of which may exist in a dissimilar prior art system. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein, e.g., as described or associated with respect to FIGS. 1A, 1B, 4A, 4B, 4C, 4D, 5A, 5B, and 7.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through a transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled, e.g., as described or associated with respect to FIGS. 1A, 1B, 2, 3, 4A, 4B, 4C, 4D, 5A, 5B, 6, and 7. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations, for example, the processes described or associated with respect to FIGS. 1A, 1B, 3, 4A, 4B, 4C, 4D, 5A, 5B, 6, and 7. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a resource provider, a shopping center, a reward handler, a reward provider, a consumer location, a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a resource provider, a shopping center, a reward handler, a reward provider, a home or office environment, a consumer location, or a server farm). In other example embodiments, the one or more processors or processor-implemented modules may be distributed across a number of geographic locations.

Some portions of this specification are presented in terms of algorithms or symbolic representations of operations on data stored as bits or binary digital transmissions within a machine memory (e.g., a computer memory, or within an object 126 including a non-transitory machine-readable medium including a non-volatile memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical transmissions capable of being stored, accessed, transferred, combined, compared, or otherwise manipulated by a machine. It is convenient at times, principally for reasons of common usage, to refer to such transmissions using words such as "data," "identifiers," "strings," "sources of identification," "consumer identifiers," "content," "bits," "values," "elements," "symbols," "digits," "characters," "terms," "numbers," "numerals," "additional data," "salting," "advertisements," "coupons," "messages," or the like. These words, however, are merely convenient labels and are to be associated with appropriate physical quantities.

Unless specifically stated otherwise, discussions herein using words such as "processing," "computing," "calculating," "determining," "assessing," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

A typical object 126 may be a physical and tangible real world item that contains at least one of a UID120, a CID122, an XID124, and a string which is electronically represented in a database as described above. At least one of the manufacture, modification, and use of an object 126 may transform the electronic representation into a physical quantity providing a method by which one or more real world transactions can be identified. This transformation of an electronic representation into a physical quantity that can identify transactions is accomplished using the methods described or associated, e.g., with respect to FIGS. 1A, 1B, 3, 4A, 4B, 4C, 4D, 5A, and 5B.

A typical voucher 140 may be a physical and tangible real world item that is electronically represented in a database as described above. The issuance of vouchers 140 may transform the electronic representation of the voucher 140 into a physical voucher 140 exchangeable for a tangible, real world reward. This transformation of an electronically represented 140 voucher into a physical voucher 140 that is exchangeable for a real world reward is accomplished using the methods described or associated, e.g., with respect to FIGS. 1A, 1B, 4A, 4B, 4C, 4D, 5A, 5B, and 7.

As used herein any reference to "one embodiment" or "an embodiment" or "an example" means that a particular element, feature, structure, or characteristic described in connection with the embodiment is included in at least one embodiment. The appearances of the phrase "in one embodiment" or "example" in various places in the specification are not necessarily all referring to the same embodiment or example.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, system, object, or apparatus that comprises a list of elements is not necessarily limited to only those elements but may include other elements not expressly listed or inherent to such process, method, article, system, object, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" or "the" are employed to describe elements and components of the embodiments herein. This is done merely for convenience and to give a general sense of the disclosed configuration. This description should be read to include one or at least one and the singular also includes the plural unless it is obvious that it is meant otherwise.

Upon reading this disclosure, those of skill in the art will appreciate still additional alternative structural and functional designs for a system, an apparatus, and a process for electronically generating rewards through the disclosed principles herein. Thus, while particular embodiments and applications have been illustrated and described, it is to be understood that the disclosed embodiments are not limited to the precise construction and components disclosed herein, and the disclosure is to be accorded the widest scope consistent with the principles and novel features disclosed herein. Various modifications, changes and variations, which will be apparent to those skilled in the art, may be made in the arrangement, operation, and details of the methods and apparatuses disclosed herein without departing from the spirit and scope defined in the appended claims. The above description of the disclosed embodiments is provided to enable any person of ordinary skill in the art to make or use the disclosure.

What is claimed is:

1. A method for receiving, retrieving, and associating in a computer database disparate database records comprising transaction records, in a computer network tied to at least one marketing system comprising at least one of an incentive and a reward and a coupon and a message, and further tied to at least one of a plurality of resource provider groups, each group having at least one of a plurality of unaffiliated resource provider members, comprising:

configuring, by a computer system comprising a database, at least one database table comprising a plurality of database records and columns, the configuring further comprising means for 1) recording a plurality of generated record associating identifiers (UIDs) and 2) providing for a plurality of formats of consumer identifiers (CIDs), in a non-transitory computer readable medium, and receiving, by the computer system, a first transaction record from a first resource provider comprising a member of a resource provider group, the first transaction record corresponding to a first transaction associated with a first user in a user market, the user market comprised of a plurality of users of a plurality of disparate types of tokens comprising objects, each token comprising one of a first requirement or no requirement for obtaining first token from a first token issuer, each token associated with at least one of a plurality of transaction records tied to the first user, the first user engaged in at least one of a plurality of transactions corresponding to the first token presented by the first user, the first user comprising a consumer, the first transaction comprising a first user behavior or act associated with the first resource provider, the first transaction record comprising additional data for generating a UID wherein the first transaction record is recorded in the database table in a first database record, the first database record comprising at least one of a plurality of database records tied to the first user; and receiving, by the computer system, a first CID corresponding to the first user, from the first token presented by the first user, the first CID comprising a string, and further comprising a first user identifier, and further comprising a first source of identification for generating a UID, and further comprising one of a first financial account identifier and a first non-financial user identifier, and further comprising a first format of a plurality of diverse formats of a plurality of types of CIDs from the plurality of disparate types of tokens, the database table configured to receive the first CID comprising the first format, wherein the first CID is recorded in the first database record; and recording, in the database by the computer system, a first association comprising the first database record and further comprising 1) the first CID and 2) the first transaction record corresponding to the first transaction of the first user; and generating, by the computer system, in the non-transitory computer readable medium, by transforming the first CID into an XID comprising a security means comprising one of encryption, an algorithm, a conversion, salting, and a tokenization, the XID further comprising the first user identifier a first unique UID comprising a second user identifier associated with the first user, the first unique UID further comprising a composite string, the composite string recorded in at least one column in the table, the composite string further comprising additional data, the additional data comprising one or more fields in the first received transaction record comprising at least one of 1) merchant-generated data and 2) consumer data, and 3) a code comprising 4) a self-generated code, the code tied to at least one of a) the merchant-generated data and b) the consumer data and c) the network tied to at least one of a marketing system and a resource provider group and d) the first user, the UID further comprising an identifier for at least one database record, and further comprising UID features comprising a standardized format for the XID for replacing the diverse formats of the plurality of types of CIDs, the standardized format further comprising a format for the additional data, the UID features further comprising a means for enabling execution of computer functions comprising at least one of searching and retrieving and associating the plurality of database records comprising the first transaction record via the generated first unique UID comprising the additional data; and recording, by the computer system, the generated first unique UID in the first database record, wherein the first association comprising the first transaction record is associated with the generated first unique UID, comprising a second association; and storing, by the computer system, the first database record comprising the second association in the database; and receiving, by the computer system, a second CID from a second user that presents a second token in a second transaction, for generating a corresponding second unique UID, the second CID comprising a second type of source of identification, and further comprising at least one of 1) a different format than the first format and 2) a CID from a second issuer and 3) a token having a different second token requirement or no requirement, the database table configured to receive the second CID comprising at least one of its different type and different format, wherein the computer system, irrespective of the type or issuer of the presented first or second token or the format or requirement or no requirement of the corresponding CID, is enabled to receive disparate transaction records and corresponding CDs of the first user and the second user via the configuring of the database table, and is enabled to perform at least one of the computer functions comprising searching and retrieving and associating the plurality of database records in the database table via the at least one of a plurality of generated UIDs.

2. The method of claim 1 wherein receiving the CID from the first token comprises receiving an identifier read by an object detector comprising a token detection device, wherein the object detector detects one or more of 1) an identifier from the first token, 2) an identifier type, 3) a digitization of the identifier, and 4) a security measure.

3. The method of claim 1 wherein the first token comprises a non-volatile computer readable medium comprising at least one of a near field communication device (NFC), a swipe card, an object, a device, a mobile device, an article of clothing, a piece of jewelry, a key chain, a purse, a wallet, jewelry, eyeglasses, a type of accessory, a code, and a pre-generated unique identifier.

4. The method of claim 1 wherein at least one of the first token and the CID comprises at least one of a string, a pattern, a code, a device, an object, an object embedded in a person, a session associated with a device, a manual entry comprising a signature, consumer data, a personal identification number (PIN), an address of any type, a graphic image, a photograph, a printed sheet, a print pattern, biometric information, and a dual use object wherein the dual use object contains 1) a first CID comprising one of a payment token and an account number and 2) a second CID comprising one of a pre-generated identifier and a UID wherein detection of the second CID is performed by the computer system.

5. The method of claim 1 wherein the first token comprises a pre-generated identifier autonomously generated by the computer system, the first token further corresponding to the first CID for transforming into the first unique UID, wherein the pre-generated identifier is distributed to the user by any method.

6. The method of claim 1 wherein the first token requirement comprises at least one of 1) a disclosure of personal or identification data, 2) an enrollment or registration with a particular payment processor or identifier issuer, 3) a use of one or more of a payment method, an account, a card, and a particular device, 4) a use of a specific source of identification, and 5) no requirement.

7. The method of claim 1 wherein at least one of the XID and the UID comprises a string associated with at least one of the first token, a digitization, a security measure comprising a means for at least one of masking and PCI DSS compliance, a string of random numbers, a rule, an incentive, a reward, a coupon, a message, a qualification for the user to receive one of a reward and an incentive and a coupon, a reward-eligible item, a reward-ineligible item, a reward provider, a fee and the additional data wherein the additional data further comprises at least one of data comprising 1) the first user behavior or act, 2) an indexing measure, and 3) an identifier.

8. The method of claim 1 wherein the generated UID enables the computer system to generate a message comprising one or more of an indication of satisfaction or non-satisfaction of program rules requirements, an unmet requirement to satisfy the rules requirements, a list of resource providers, an incentive or offer, a list of rewards, an advertisement, a coupon, and program information.

9. The method of claim 1 comprising:
retrieving, by the computer system from the database, a third association comprising a second database record associated with the first user, the third association generated in the same manner as the second association and associated with a resource provider comprising a second resource provider, and further comprising a second transaction record associated with the first unique UID; and associating, in the database by the computer system, via the generated UID, the first database record comprising the second association and the second database record comprising the third association to generate a fourth association, the fourth association comprising a set of the first and the second database records, the fourth association comprising an association suitable for at least one of processing and assessing and analyzing the plurality of database records via the first unique UID; and storing, in the database by the computer system, the fourth association.

10. The method of claim 1 wherein the first CID comprises at least one of a digital or a digitized representation of a source of identification comprising at least one of an object, a card, an entry in an input device comprising a manual entry, a biometric reading, a personal identification number, a code, an account number, a device identifier, an IP address, a phone number, a serial number, an e-mail address, a social network address, a passport identifier, a driver license identifier, a vehicle identifier, and a pre-generated unique identifier.

11. The method of claim 1 wherein the computer functions enabled via the at least one of a plurality of the generated UIDs further comprise at least one of 1) determining satisfaction of a qualification for a reward and 2) issuing at least one voucher exchangeable for a reward and 3) aggregating two or more vouchers and 4) issuing at least one coupon comprising an adaptive coupon and 5) authenticating at least one voucher and 6) redeeming a voucher for an incentive.

12. The method of claim 1 wherein the computer functions enabled via the at least one of a plurality of the generated UIDs further comprise at least one of indexing and assessing and analyzing the plurality of database records and messaging.

13. A non-transitory computer readable medium comprising instructions and a computer database, for receiving, retrieving, and associating in the computer database disparate database records comprising transaction records, in a computer network tied to at least one marketing system comprising at least one of an incentive and a reward and a coupon and a message, and further tied to at least one of a plurality of resource provider groups; each group having at least one of a plurality of unaffiliated resource provider members, that when executed by a computer processor cause the computer processor to be configured for:

configuring the database, comprising at least one database table comprising a plurality of database records and columns, the configuring further comprising means for 1) recording a plurality of generated record associating identifiers (UIDs) and 2) providing for a plurality of formats of consumer identifiers (CIDs); and receiving a first transaction record from a first resource provider comprising a member of a resource provider group, the first transaction record corresponding to a first transaction associated with a first user in a user market, the user market comprised of a plurality of users of a plurality of disparate types of tokens comprising objects, each token comprising one of a first requirement or no requirement for obtaining first token from a first token issuer, each token associated with at least one of a plurality of transaction records tied to the first user, the first user engaged in at least one of a plurality of transactions corresponding to the first token presented by the first user, the first user comprising a consumer, the first transaction comprising a first user behavior or act associated with the first resource provider, the first transaction record comprising additional data for generating a UID wherein the first transaction record is recorded in the database table in a first database record, the first database record comprising at least one of a plurality of database records tied to the first user; and receiving a first CID corresponding to the first user, from the first token presented by the first user, the first CID comprising a string, and further comprising a first user identifier, and further comprising a first source of identification for generating a UID, and further comprising one of a first financial account identifier and a first non-financial user identifier, and further comprising a first format of a plurality of diverse formats of a plurality of types of CIDs from the plurality of disparate types of tokens, the database table configured to receive the first CID comprising the first format, wherein the first CID is recorded in the first database record; and recording in the database a first association comprising the first database record and further comprising 1) the first CID and 2) the first transaction record corresponding to the first transaction of the first user; and generating in the non-transitory computer readable medium, by transforming the first CID into an XID comprising a security means comprising one of encryption, an algorithm, a conversion, salting, and a tokenization, the XID further comprising the first user identifier, a first unique UID comprising a second user identifier associated with the first user, the first unique UID further comprising a composite string, the composite string recorded in at least one column in the table, the composite string further comprising additional data, the additional data comprising one or more fields in the first received transaction record comprising at least one of 1) merchant-generated data and 2) consumer data, and 3) a code comprising 4) a self-generated code, the code tied to at least one of a) the merchant-generated data and b) the consumer data and c) the network tied to at least one of a marketing system and a resource provider group and d) the first user, the UID further comprising an identifier for at least one database record, and further comprising UID features comprising a standardized format for the XID for replacing the diverse formats of the plurality of types of CIDs, the standardized format further comprising a format for the additional data, the UID features further comprising a means for enabling execution of computer functions comprising at least one of searching and retrieving and associating the plurality of database records comprising the first transaction record via the generated first unique UID comprising the additional data; and recording the generated first unique UID in the first database record, wherein the first association comprising the first transaction record is associated with the generated first unique UID, comprising a second association; and storing the first database record comprising the second association in the database; and receiving a second CID from a second user that presents a second token in a second transaction, for generating a corresponding second unique UID, the second CID comprising a second type of source of identification, and further comprising at least one of 1) a different format than the first format and 2) a CID from a second issuer and 3) a token having a different second token requirement or no requirement, the database table configured to receive the second CID comprising at least one of its different type and different format, wherein the computer processor, irrespective of the type or issuer of the presented first or second token or the format or requirement or no requirement of the corresponding CID, is enabled to receive disparate transaction records and corresponding CDs of the first user and the second user via the configuring of the database table and is enabled to perform at least one of the computer functions comprising searching and retrieving and associating the plurality of database records in the database table via the at least one of a plurality of generated UIDs.

14. The non-transitory computer readable medium of claim 13 wherein receiving the CID from the first token comprises receiving an identifier read by an object detector comprising a token detection device, wherein the object detector detects one or more of 1) an identifier from the first token, 2) an identifier type, 3) a digitization of the identifier, and 4) a security measure.

15. The non-transitory computer readable medium of claim 13 wherein the first token comprises a non-volatile computer readable medium comprising at least one of a near field communication device (NFC), a swipe card, an object, a device, a mobile device, an article of clothing, a piece of jewelry, a key chain, a purse, a wallet, jewelry, eyeglasses, a type of accessory, a code, and a pre-generated unique identifier.

16. The non-transitory computer readable medium of claim 13 wherein at least one of the first token and the CID comprises at least one of a string, a pattern, a code, a device, an object, an object embedded in a person, a session associated with a device, a manual entry comprising a signature, consumer data, a personal identification number (PIN), an address of any type, a graphic image, a photograph, a printed sheet, a print pattern, biometric information, and a dual use object wherein the dual use object contains 1) a first CID comprising one of a payment token and an account number and 2) a second CID comprising one of a pre-generated identifier and a UID wherein detection of the second CID is performed by the computer processor.

17. The non-transitory computer readable medium of claim 13 wherein the first token comprises a pre-generated identifier autonomously generated by the computer system, the first token further corresponding to the first CID for transforming into the first unique UID, wherein the pre-generated identifier is distributed to the user by any method.

18. The non-transitory computer readable medium of claim 13 wherein the first token requirement comprises at least one of 1) a disclosure of personal or identification data, 2) an enrollment or registration with a particular payment processor or identifier issuer, 3) a use of one or more of a payment method, an account, a card, and a particular device, 4) a use of a specific source of identification, and 5) no requirement.

19. The non-transitory computer readable medium of claim 13 wherein at least one of the XID and the UID comprises a string associated with at least one of the first token, a digitization, a security measure comprising a means for at least one of masking and PCI DSS compliance, a string of random numbers, a rule, an incentive, a reward, a coupon, a message, a qualification for the user to receive one of a reward and an incentive and a coupon, a reward-eligible item, a reward-ineligible item, a reward provider, a fee and the additional data wherein the additional data further comprises at least one of data comprising 1) the first user behavior or act, 2) an indexing measure, and 3) an identifier.

20. The non-transitory computer readable medium of claim 13 wherein the generated UID enables the computer processor to generate a message comprising one or more of an indication of satisfaction or non-satisfaction of program rules requirements, an unmet requirement to satisfy the rules requirements, a list of resource providers, an incentive or offer, a list of rewards, an advertisement, a coupon, and program information.

21. The non-transitory computer readable medium of claim 13 comprising retrieving from the database a third association comprising a second database record associated with the first user, the third association generated in the same manner as the second association and associated with a resource provider comprising a second resource provider, and further comprising a second transaction record associated with the first unique UID; and associating in the database, via the generated UID, the first database record comprising the second association and the second database record comprising the third association to generate a fourth association, the fourth association comprising a set of the first and the second database records, the fourth association comprising an association suitable for at least one of processing and assessing and analyzing the plurality of database records via the first unique UID; and storing the fourth association.

22. The non-transitory computer readable medium of claim 13 wherein the first CID comprises at least one of a digital or a digitized representation of a source of identification comprising at least one of an object, a card, an entry in an input device comprising a manual entry, a biometric reading, a personal identification number, a code, an account number, a device identifier, an IP address, a phone number, a serial number, an e-mail address, a social network address, a passport identifier, a driver license identifier, a vehicle identifier, and a pre-generated unique identifier.

23. The non-transitory computer readable medium of claim 13 wherein the computer functions enabled via the first unique UID further comprise at least one of 1) determining satisfaction of a qualification for a reward and 2) issuing at least one voucher exchangeable for a reward and 3) aggregating two or more vouchers and 4) issuing at least one coupon comprising an adaptive coupon and 5) authenticating at least one voucher and 6) redeeming a voucher for an incentive.

24. The non-transitory computer readable medium of claim 13 wherein the computer functions enabled via the at least one of a plurality of the generated UIDs further comprise at least one of indexing and assessing and analyzing the plurality of database records and messaging.

25. A system comprising:
a computer processor; and
a computer database; and
a non-transitory computer readable medium coupled to the processor and the database and comprising instructions, that when executed by the computer processor cause the computer processor to be configured to:
configure the database, comprising at least one database table comprising a plurality of database records and columns, the configuring further comprising means for 1) recording a plurality of generated record associating identifiers (UIDs) and 2) providing for a plurality of formats of consumer identifiers (CIDs); and
receive a first transaction record from a first resource provider comprising a member of at least one of a plurality of resource provider groups, having at least one of a plurality of unaffiliated resource provider members, in a computer network tied to at least one marketing system comprising at least one of an incentive and a reward and a coupon and a message, the first transaction record corresponding to a first transaction associated with a first user in a user market, the user market comprised of a plurality of users of a plurality of disparate types of tokens comprising objects, each token comprising one of a first requirement or no requirement for obtaining first token from a first token issuer, each token associated with at least one of a plurality of transaction records tied to the first user, the first user engaged in at least one of a plurality of transactions corresponding to the first token presented by the first user, the first user comprising a consumer, the first transaction comprising a first user behavior or act associated with the first resource provider, the first transaction record comprising additional data for generating a UID wherein the first transaction record is recorded in the database table in a first database record, the first database record comprising at least one of a plurality of database records tied to the first user; and receive a first CID corresponding to the first user, from the first token presented by the first user, the first CID comprising a string, and further comprising a first user identifier, and further comprising a first source of identification for generating a UID, and further comprising one of a first financial account identifier and a first non-financial user identifier, and further comprising a first format of a plurality of diverse formats of a plurality of types of CIDs from the plurality of disparate types of tokens, the database table configured to receive the first CID comprising the first format, wherein the first CID is recorded in the first database record; and record in the database a first association comprising the first database record and further comprising 1) the first CID and 2) the first transaction record corresponding to the first transaction of the first user; and generate in the non-transitory computer readable medium, by transforming the first CID into an XID comprising a security means comprising one of encryption, an algorithm, a conversion, salting, and a tokenization, the XID further comprising the first user identifier, a first unique UID comprising a second user identifier associated with the first user, the first unique UID further comprising a composite string, the composite string recorded in at least one column in the table, the composite string further comprising additional data, the additional data comprising one or more fields in the first received transaction record comprising at least one of 1) merchant-generated data and 2) consumer data, and 3) a code comprising 4) a self-generated code, the code tied to at least one of a) the merchant-generated data and b) the consumer data and c) the network tied to at least one of a marketing system and a resource provider group and d) the first user, the UID further comprising an identifier for at least one database record, and further comprising UID features comprising a standardized format for the XID for replacing the diverse formats of the plurality of types of CIDs, the standardized format further comprising a format for the additional data, the UID features further comprising a means for enabling execution of computer functions comprising at least one of searching and retrieving and associating the plurality of database records comprising the first transaction record via the generated first unique UID comprising the additional data; and record the generated first unique UID in the first database record, wherein the first association comprising the first transaction record is associated with the generated first unique UID, comprising a second association; and store the first database record comprising the second association in the database; and receive a second CID from a second user that presents a second token in a second transaction, for generating a corresponding second unique UID, the second CID comprising a second type of source of identification, and further comprising at least one of 1) a different format than the first format and 2) a CID from a second issuer and 3) a token having a different second token requirement or no requirement, the database table configured to receive the second CID comprising at least one of its different type and different format, wherein the computer processor, irrespective of the type or issuer of the presented first or second token or the format or requirement or no requirement of the corresponding CID, is enabled to receive disparate transaction records and corresponding CDs of the first user and the second user via the configuring of the database table, and is enabled to perform at least one of the computer functions comprising searching and retrieving and associating the plurality of database records in the database table via the at least one of a plurality of generated UIDs.

26. The system of claim 25 wherein receiving the CID from the first token comprises receiving an identifier read by an object detector comprising a token detection device, wherein the object detector detects one or more of 1) an identifier from the first token, 2) an identifier type, 3) a digitization of the identifier, and 4) a security measure.

27. The system of claim 25 wherein the first token comprises a non-volatile computer readable medium comprising at least one of a near field communication device (NFC), a swipe card, an object, a device, a mobile device, an article of clothing, a piece of jewelry, a key chain, a purse, a wallet, jewelry, eyeglasses, a type of accessory, a code, and a pre-generated unique identifier.

28. The system of claim 25 wherein at least one of the first token and the CID comprises at least one of a string, a pattern, a code, a device, an object, an object embedded in a person, a session associated with a device, a manual entry comprising a signature, consumer data, a personal identification number (PIN), an address of any type, a graphic image, a photograph, a printed sheet, a print pattern, biometric information, and a dual use object wherein the dual use object contains 1) a first CID comprising one of a payment token and an account number and 2) a second CID comprising one of a pre-generated identifier and a UID wherein detection of the second CID is performed by the computer processor.

29. The system of claim 25 wherein the first token comprises a pre-generated identifier autonomously generated by the computer system, the first token further corresponding to the first CID for transforming into the first unique UID, wherein the pre-generated identifier is distributed to the user by any method.

30. The system of claim 25 wherein the first token requirement comprises at least one of 1) a disclosure of personal or identification data, 2) an enrollment or registration with a particular payment processor or identifier issuer, 3) a use of one or more of a payment method, an account, a card, and a particular device, 4) a use of a specific source of identification, and 5) no requirement.

31. The system of claim 25 wherein at least one of the XID and the UID comprises a string associated with at least one of the first token, a digitization, a security measure comprising a means for at least one of masking and PCI DSS compliance, a string of random numbers, a rule, an incentive, a reward, a coupon, a message, a qualification for the user to receive one of a reward and an incentive and a coupon, a reward-eligible item, a reward-ineligible item, a reward provider, a fee and the additional data wherein the additional data further comprises at least one of data comprising 1) the first user behavior or act, 2) an indexing measure, and 3) an identifier.

32. The system of claim 25 wherein the generated UID enables the computer processor to generate a message comprising one or more of an indication of satisfaction or non-satisfaction of program rules requirements, an unmet requirement to satisfy the rules requirements, a list of resource providers, an incentive or offer, a list of rewards, an advertisement, a coupon, and program information.

33. The system of claim 25 wherein the non-transitory computer readable medium coupled to the processor and the database and comprising instructions, that when executed by the computer processor cause the computer processor to be configured to:
retrieve from the database a third association comprising a second database record associated with the first user, the third association generated in the same manner as the second association and associated with a resource provider comprising a second resource provider, and further comprising a second transaction record associated with the first unique UID; and
associate in the database, via the generated UID, the first database record comprising the second association and the second database record comprising the third association to generate a fourth association, the fourth association comprising a set of the first and the second database records, the fourth association comprising an association suitable for at least one of processing and assessing and analyzing the plurality of database records via the first unique UID; and
store the fourth association.

34. The system of claim 25 wherein the first CID comprises at least one of a digital or a digitized representation of a source of identification comprising at least one of an object, a card, an entry in an input device comprising a manual entry, a biometric reading, a personal identification number, a code, an account number, a device identifier, an IP address, a phone number, a serial number, an e-mail address, a social network address, a passport identifier, a driver license identifier, a vehicle identifier, and a pre-generated unique identifier.

35. The system of claim 25 wherein the computer functions enabled via the first unique UID further comprise at least one of 1) determining satisfaction of a qualification for a reward and 2) issuing at least one voucher exchangeable for a reward and 3) aggregating two or more vouchers and 4) issuing at least one coupon comprising an adaptive coupon and 5) authenticating at least one voucher and 6) redeeming a voucher for an incentive.

36. The system of claim 25 wherein the computer functions enabled via the at least one of a plurality of the generated UIDs further comprise at least one of indexing and assessing and analyzing the plurality of database records and messaging.

* * * * *